United States Patent
Preis et al.

(10) Patent No.: US 8,391,278 B2
(45) Date of Patent: Mar. 5, 2013

(54) METHOD OF PROVIDING A SERVICE OVER A HYBRID NETWORK AND SYSTEM THEREOF

(75) Inventors: Itai Preis, Tel Aviv (IL); Dan Julius, Giva'at Ada (IL)

(73) Assignee: Joliper Ltd., Tel Aviv (IL)

( * ) Notice: Subject to any disclaimer, the term of this patent is extended or adjusted under 35 U.S.C. 154(b) by 635 days.

(21) Appl. No.: 12/559,123

(22) Filed: Sep. 14, 2009

(65) Prior Publication Data
US 2010/0002606 A1 Jan. 7, 2010

Related U.S. Application Data

(63) Continuation-in-part of application No. PCT/IL2008/000340, filed on Mar. 12, 2008.

(60) Provisional application No. 60/894,356, filed on Mar. 12, 2007.

(51) Int. Cl.
H04L 12/66 (2006.01)
(52) U.S. Cl. .................... 370/352; 370/465
(58) Field of Classification Search .............. None
See application file for complete search history.

(56) References Cited

U.S. PATENT DOCUMENTS

| | | | |
|---|---|---|---|
| 7,330,536 B2 * | 2/2008 | Claudatos et al. | 379/68 |
| 2002/0001370 A1 | 1/2002 | Walker et al. | |
| 2005/0259601 A1 | 11/2005 | Rosenberg et al. | |
| 2007/0008948 A1 | 1/2007 | Jung et al. | |
| 2007/0036135 A1 * | 2/2007 | Patron et al. | 370/352 |
| 2007/0053346 A1 * | 3/2007 | Bettis et al. | 370/352 |
| 2007/0165598 A1 | 7/2007 | Hynonen et al. | |

(Continued)

FOREIGN PATENT DOCUMENTS

| WO | WO 02/103977 A2 | 12/2002 |
|---|---|---|
| WO | WO 2005/032164 A1 | 4/2005 |

OTHER PUBLICATIONS

"Radvision announces comprehensive suite of 3G and WIFI developer solutions," Radvision Press Release (http://www.radvision.com/NR/rdonlyres/FAD98DC5-D096-4B1A-AC7F-C6DE5A2E9F77/0/RADVISIONAnnouncesComprehensiveSuiteof3GDeveloperS.pdf), Feb. 23, 2004.

(Continued)

Primary Examiner — Hassan Phillips
Assistant Examiner — Duc Duong
(74) Attorney, Agent, or Firm — Oliff & Berridge, PLC

(57) ABSTRACT

There is provided a service system, application platform, application design framework and method of providing a service over a hybrid network comprising at least one circuit-switched network and at least one packet-switched network connected via at least one gateway configured to provide necessary conversion to a video call passing between the packet-switched network and the circuit-switching network. The application design framework is configured to be located in the packet-switched network, to be operatively interfaced to the gateway and to enable development of one or more applications to be accommodated by said framework. The application framework is further configured to be capable of receiving a video call initiated by a video device from the circuit-switched network and transferred through the gateway and of further serving as an end-point of said video call; analyzing, at least, in-band information comprised in the received video call therefore recognizing user-related information; providing the recognized user-related information to one or more applications when accommodated by the framework; and, optionally, of handling one or more media streams in accordance with instructions by one or more applications when accommodated by the framework.

19 Claims, 15 Drawing Sheets

U.S. PATENT DOCUMENTS

| | | |
|---|---|---|
| 2007/0177616 A1 | 8/2007 | Jabri et al. |
| 2007/0206577 A1* | 9/2007 | Bennett .......................... 370/356 |
| 2007/0223462 A1* | 9/2007 | Hite et al. ...................... 370/356 |
| 2007/0280204 A1* | 12/2007 | Howell et al. .................. 370/352 |
| 2008/0002667 A1* | 1/2008 | Smith et al. .................... 370/352 |
| 2008/0034396 A1 | 2/2008 | Lev |
| 2011/0255513 A1* | 10/2011 | Karaoguz et al. ............. 370/331 |

OTHER PUBLICATIONS

Andersson et al., "3G-324M Video Client/Server," Master Thesis (http://www.student.nada.kth.se/i95win/exjobb/Thesis_Andersson_Wirde_a.pdf), Jan. 26, 2005.

\* cited by examiner

METHOD OF PROVIDING A SERVICE OVER A HYBRID NETWORK AND SYSTEM THEREOF

This is a Continuation-In-Part of International Application No. PCT/IL2008/000340filed Mar. 12, 2008, which claims the benefit of U.S. Provisional Application No. 60,894,356 filed Mar. 12, 2007. The disclosure of the prior applications is hereby incorporated by reference herein in its entirety.

FIELD OF THE INVENTION

The present invention generally relates to communication systems. More particularly, the invention relates to methods and systems for providing services over hybrid networks.

BACKGROUND OF THE INVENTION

The paradigm of modern telecommunication network enables a single network to provide voice, video, data and integrated multimedia services. Accordingly, these networks are characterized by a hybrid architecture combining circuit-switched and packet-switched networks. Among main drivers for deployment of such hybrid networks (e.g. 3G mobile networks, emerging next generation networks, etc.) are video-based applications, such as, for example, video conferencing, video telephone conversation, video streaming, video messaging, interactive video-content delivery, and others.

The problem of providing video-based services over a hybrid network has been recognized in the Prior Art and various systems have been developed to provide a solution, for example:

US Patent Application No. 2008/034,396 (Lev Zvi) entitled "System and method for video distribution and billing" discloses a system for distribution of video and audio data, and multiple methods for using video and audio data, including, among others, methods for optimizing use of mobile radio bandwidth, optimizing use of technical limitations in wireless devices, for allowing users to use premium SMS to interact with the data distribution system, and for verifying the status of a user.

US Patent Application No. 2005/259,601 (Fisher, et al) entitled "Video conferencing over public network" discloses a method of handling video signals by a gateway. The method includes receiving by a gateway between a land cellular network and a public switched telephone network, video signals of a real time session from an end unit, reducing the rate of the video signals and transmitting the rate reduced video signals onto a channel passing through a public switched telephone network.

US Patent Application No. 2007/165,598 (Hynonen et al.) entitled "Intelligent multimedia calls" discloses a method of setting up and/or controlling a multimedia call involving an H.324 enabled user terminal and a circuit switched connection terminating at the user terminal and at a video gateway, the method comprising: sending DTMF control signals over the circuit switched connection within H.245 protocol control messages; and on the basis of said DTMF control signals, routing or re-routing the connection to an appropriate data source or mapping the connection to an appropriate data source.

US Patent Application No. 2007/177,616 (Wong et al.) entitled "Interactive multimedia exchange architecture and services" discloses a method of communicating media using a multimedia terminal, the method comprising: receiving, at a multimedia exchange server, a request to establish a communication link between the multimedia terminal and the multimedia exchange server; establishing the communication link between the multimedia terminal and the multimedia exchange server; receiving, at the multimedia exchange server, a first media stream from the multimedia terminal; transmitting a second media stream from the multimedia exchange server to a device; transmitting an interactive menu from the multimedia exchange server to the multimedia terminal; and receiving, at the multimedia terminal, one or more user inputs in response to the interactive menu, wherein the multimedia exchange server is responsive to the one or more user inputs. The multimedia terminal comprises at least one of a 3G phone, a 3G server, or a 3G gateway.

SUMMARY OF THE INVENTION

In accordance with certain aspects of the present invention, there is provided a service system for use in a hybrid network comprising at least one circuit-switched network and at least one packet-switched network connected via at least one gateway configured to provide necessary conversion to a video call passing between the packet-switched network and the circuit-switching network. The service system is configured to be located in the packet-switched network and to be operatively interfaced to the gateway. the service system comprising a service platform and one or more application platforms configured to accommodate two or more applications and operatively connected to the service platform, The service platform comprises a) a network interface adapted for receiving the video call transferred through the gateway, and for analyzing, at least, the call in-band information, therefore recognizing a desired destination; and b) a call manager operatively coupled to the network interface and adapted for re-directing the video call in accordance with the desired destination to respective application platform and to enable transferring, at least, entire in-band information to the application platform, thus enabling the application platform to serve as an end-point for the video call, wherein the call manager is further configured to derive meta-data comprised, at least, in the in-band information and transfer this meta-data and/or derivatives thereof to the application platform as a first token assigned to the video-call.

In accordance with other aspects of the invention, there is provided a method of providing a service over a hybrid network comprising at least one circuit-switched network and at least one packet-switched network connected via at least one gateway configured to provide necessary conversion to a video call passing between the packet-switched network and the circuit-switching network. The method comprises:
  (a) directing a video call initiated by a video device to a service platform located in the packet-switched network and configured to be operatively interfaced to the gateway and to one or more application platforms configured to accommodate one or more applications,
  (b) receiving the video call by the service platform;
  (c) further analyzing, at least, call in-band information and therefore recognizing a desired destination,
  (d) deriving meta-data comprised, at least, in the in-band information;
  (e) generating a first token comprising the derived meta-data and/or derivatives thereof; and
  (f) transferring the call and corresponding generated first token to respective application platform configured to serve as an end-point for the video call.

The first token may further comprise information obtained from a third party database.

In accordance with other aspects of the present invention there is provided an application platform for use in a hybrid network comprising at least one circuit-switched network and at least one packet-switched network connected via at least one gateway configured to provide necessary conversion to a video call passing between the packet-switched network and the circuit-switching network. The application platform is configured to be located in the packet-switched network and to be operatively interfaced (directly and/or indirectly) to the gateway and to accommodate one or more applications. The application platform is further configured to be capable of:

(a) receiving a video call initiated by a video device from the circuit-switched network and transferred through the gateway and for further serving as an end-point of said video call;

(b) analyzing, at least, meta-data and/or derivatives thereof comprised in a first token received with the video call therefore recognizing user-related information;

(c) providing one or more services in accordance with said recognized user-related information.

In accordance with further aspects of the present invention, the application platform may be further configured to generate a second token to be assigned to and transferred with the video call, said second token comprising data and/or derivatives thereof received from the first token and/or out-band user-related information and/or an up-stream media.

In accordance with further aspects of the present invention, the information obtained with the first token may be used for generation of a second token assigned to the video-call, for personalization of application presentation; personalization of application navigation; personalization of a downstream content, personalization of a downstream content format, personalization of a downstream mode of transmission (e.g. one-to-one, one-to many, combined, etc.), and the like.

The first token and/or the second token may comprise such information as Caller ID, SIM number, dialed number (e.g. for services depending on dialed number), location of the calling user, characteristics of calling video device, calling user-related data (e.g. preferences, PIN-code, account, biometry, etc., including data obtained from the user by previous applications), application specific data (e.g. name of content, URL, application-specific preferences, etc.), call state, call history, DTMF signals generated by the user, etc.

In accordance with other aspects of the present invention, there is provided an application design framework for use in a hybrid network comprising at least one circuit-switched network and at least one packet-switched network connected via at least one gateway configured to provide necessary conversion to a video call passing between the packet-switched network and the circuit-switching network. The application design framework is configured to be located in the packet-switched network, to be operatively interfaced (directly and/or indirectly) to the gateway and to enable development of one or more applications to be accommodated by said framework. The application framework is further configured to be capable of:

(a) receiving a video call initiated by a video device from the circuit-switched network and transferred through the gateway, and for further serving as an end-point of said video call;

(b) analyzing, at least, meta-data and/or derivatives thereof received together with the video call, and (c) further enabling providing said meta-data and/or derivatives thereof to one or more applications when accommodated by the framework.

The application framework may be further configured to be capable of handling one or more media streams in accordance with instructions by one or more applications when accommodated by the framework. The application framework may be further configured to enable development and further accommodate at least one of applications selected from a group comprising interactive video game, multi-user videogame, camera surveillance applications, multi-user phone blogging application, real-time data feeds for push and pull services, such as system monitoring, financial, weather, news, and traffic updates.

In accordance with further aspects of the invention, the application framework may be further configured to extract data from an up-stream media received via the video call and to provide the extracted data to one or more applications when accommodated by the framework.

In accordance with further aspects of the present invention, the application framework may be further configured to initiate a video call to one or more users, said call being requested by one or more applications when accommodated by the framework.

In accordance with further aspects of the present invention, the application framework may be further configured to enable the accommodated application to generate a second token to be assigned to and transferred with the video call, said second token comprising data received by the application from the call manager and/or the media manager.

In accordance with further aspects of the present invention, the application framework further may further comprise:

(a) one or more low level communication interfaces;

(b) one or more protocol stacks;

(c) means for handling a video call;

(d) means for processing upstream and/or downstream media;

(e) low API level configured to enable the developed application at least to receive incoming calls, generate outbound calls, receive and respond to signaling events, receive and send media;

(f) high level API configured to provide at least a simplified set of necessary functions and callbacks for application development in high level languages;

(g) a library of prepared applications.

In accordance with other aspects of the present invention, there is provided a method of operating jitter buffers enabling reduction of latency between the time audio/video frames are generated by the application, and the time they are displayed on the cellular phone. Latency is reduced by clearing the jitter buffers through the media path as detailed in the present invention. The method enables an application to signal to the application framework and/or service platform that a given frame should be encoded as a key-frame. The application is further capable to request that a given key-frame be delivered as fast as possible to the cellular phone, by flushing (clearing) all intermediate jitter buffers. Flushing may be provided for only audio buffers, only video buffers, and both audio and video buffers, as required by the application.

Among advantages of certain aspects of the present invention is enabling a variety of video-based services provided in accordance with user-related information received via in-band signaling and/or video and/or audio content received in an upstream of the video-call. Such services include callback-based services, multi-user gaming and other interactive services, etc. Also among advantages of certain embodiments of the present invention is enabling effective creation of various applications desired to provide such video-based services.

BRIEF DESCRIPTION OF THE DRAWINGS

In order to understand the invention and to see how it may be carried out in practice, an embodiment will now be described, by way of non-limiting example only, with reference to the accompanying drawings, in which.

DETAILED DESCRIPTION OF EXEMPLARY EMBODIMENTS

Figure 1:
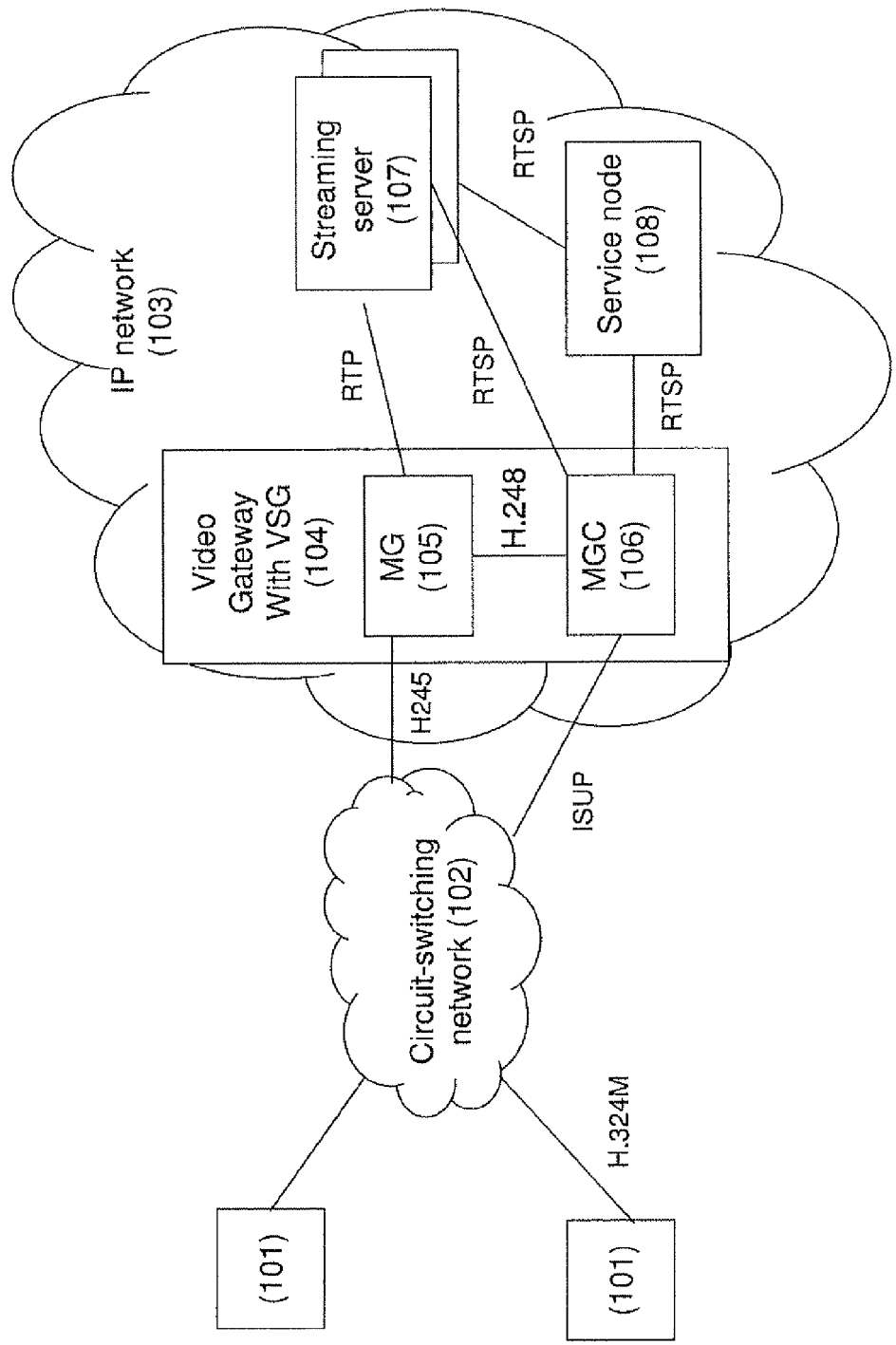
FIG. 1 illustrates a generalized exemplary hybrid network as known in the art.

In the following detailed description, numerous specific details are set forth in order to provide a thorough understanding of the invention. However, it will be understood by those skilled in the art, that the present invention may be practiced without these specific details. In other instances, well-known methods, procedures, components and circuits have not been described in detail so as not to obscure the present invention. In the drawings and descriptions, identical reference numerals indicate those components that are common to different embodiments or configurations.

The references cited in the background teach many principles of providing video-based services in hybrid networks that are applicable to the present invention. Therefore the full contents of these publications are incorporated by reference herein where appropriate for appropriate teachings of additional or alternative details, features and/or technical background.

Unless specifically stated otherwise, as apparent from the following discussions, it is appreciated that throughout the specification discussions utilizing terms such as "processing", "computing", "calculating", "determining", "counting", "generating" or the like, refer to the action and/or processes of a computer that manipulate and/or transform data into other data, said data represented as physical, such as electronic, quantities and/or representing the physical objects. The term "computer" should be expansively construed to cover any kind of electronic device with data processing capabilities, including, by way of non-limiting example, personal computers, servers, computing system, communication devices, storage devices, processors (e.g. digital signal processor (DSP), microcontrollers, field programmable gate array (FPGA), application specific integrated circuit (ASIC), etc.) and other electronic computing devices.

The operations in accordance with the teachings herein may be performed by a computer specially constructed for the desired purposes or by a general purpose computer specially configured for the desired purpose by a computer program stored in a computer readable storage medium.

Embodiments of the present invention are not described with reference to any particular programming language. It will be appreciated that a variety of programming languages may be used to implement the teachings of the inventions as described herein.

The term "user" or "caller" used in this patent specification should be expansively construed to include any video-telephony device user. The video-telephony device user may be a human user, or may be an automatic or semi-automatic system, such as a security system which may be fully automated or which may have human involvement.

The term "video call" used in this patent specification should be expansively construed to include any two-way and/or one-way communication between an originating endpoint and a terminating endpoint in accordance with any of video and/or multimedia communication protocols and involving a video-telephony device as, at least, one endpoint of such communication.

The term "bookmark" used in this patent specification should be expansively construed to include any type of a record of the address of a content of interest. The bookmark may mark a certain place in an electronic document, be used as a pointer in an Internet browser (e.g. to a web page URL, a part of a page, image from a picture site, etc.) or otherwise point to a desired content.

The term "video-telephony device" or "video-device" used in this patent specification should be expansively construed to include any device capable of holding a video telephony session, including, for example, 3G videophones, a PC with a webcam, fixed line videophone and others.

In the following text, reference is made to certain protocols defined by the International Telecommunications Union (ITU), namely: H.324—Terminal for low bit-rate multimedia communication; H.223—Multiplexing protocol for low bit rate multimedia communication; H.245—Control protocol for multimedia communication; H.323—Packet-based multimedia communications systems. Also reference is made to 3G-324M Technical Specification defined by the Third Generation Partnership Project (3GPP) and based on H.324 protocol and to Session Initiation Protocol (SIP) as developed by International Engineering Task Force (IETF).

Bearing the above in mind, attention is drawn to FIG. 1 schematically illustrating an exemplary hybrid network as known in the art and detailed, by way of non-limiting example, in US Patent Application No. 2007/165,598. The hybrid network includes one or more circuit-switching (including wire-line and/or wireless portions) networks 102 operatively connected to one or more packet-switched networks 103 via one or more gateways 104 converting the signals between the different formats used in the packet-switched network 103 and in the circuit-switching network 102. The gateway 104 comprises a media gateway 105 and a media gateway controller (MGC) 106. The gateway 104 is configured to provide video streaming gateway (VSG) capabilities enabling connecting between circuit-switched video devices and packet-switched based services provided by one or more streaming servers 107 operatively coupled to the gateway. A call by a video-telephony device (illustrated, by way of non-limiting example, by video-enabled cellular phone 101) is initiated in accordance with 3G-324M protocol for setting up and controlling multimedia communication sessions, and directed by the circuit-switched network (e.g. GSM or UMTS) to the gateway 104 serving as a terminating endpoint of the call. As illustrated in FIG. 1, the gateway inter-works between ISUP+H.245 and real time streaming protocol (RTSP) on the control plane and between TDM and IP/RTP on the user plane. The gateway comprises a database of destination numbers associated with certain streaming servers. Accordingly, the gateway maps the destination numbers to respective URLs, MGC communicates with the respective streaming server, and the streaming server starts streaming of the desired content.

Optionally, the service logic may be de-coupled from the gateway and be provided by a service node 108 operatively coupled with the gateway 104 and the streaming server 107. A user may further use DTMF signals to control the services provided by the streaming server. The DTMF signals are extracted from the H.245 messages at the media gateway controller 106 and forwarded to the service node as "X-VIG-DTMF" elements of RTSP message. In this network architecture the appropriate URLs are identified by the service node, and the service node further communicates to the streaming server to initiate streaming of the desired content. Other applications known in prior art as, for example, video mail, are configured to work in a similar manner—in accordance with URLs and/or DTMFs extracted by the video gateway serving as a terminating endpoint.

Figure 2:
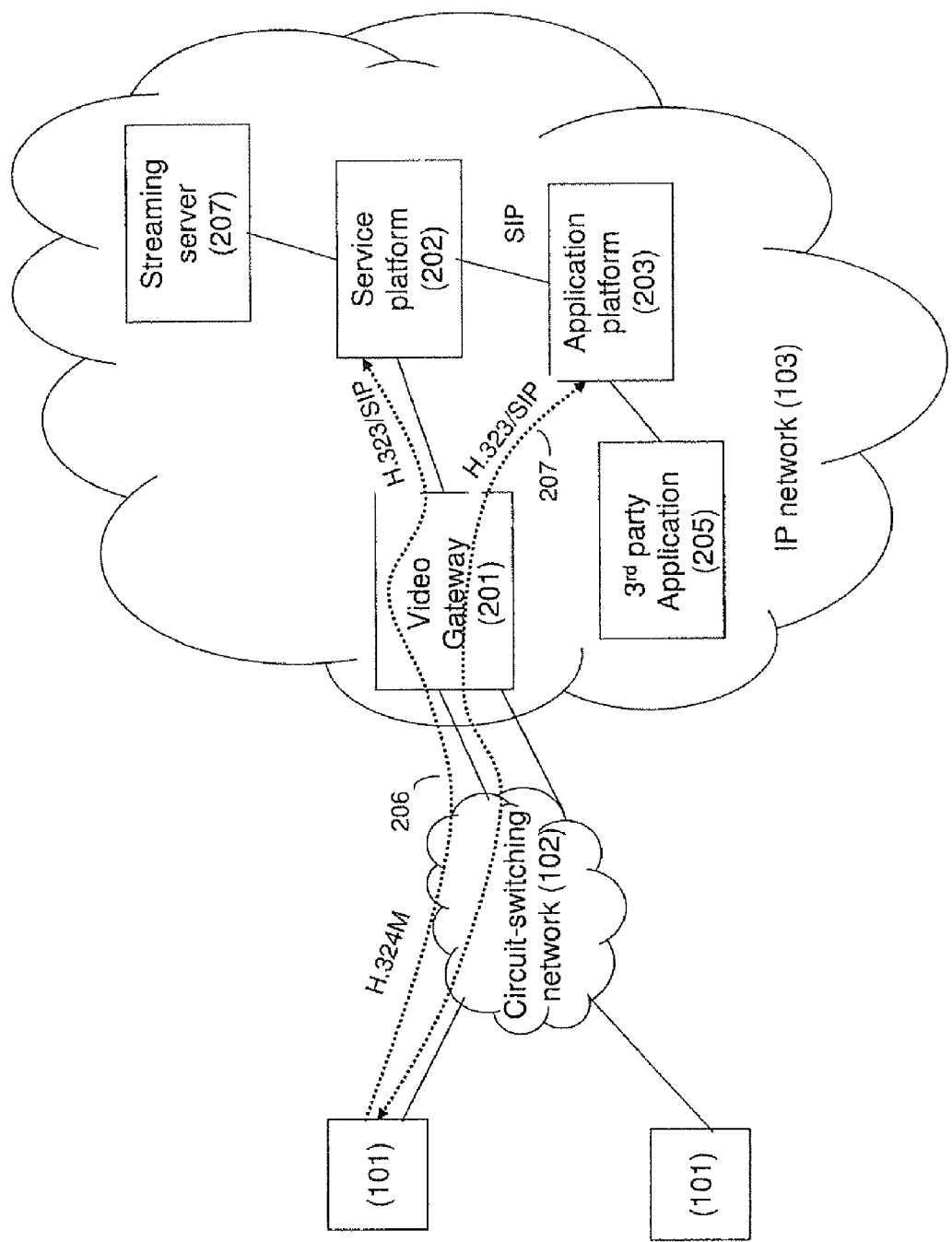
FIG. 2 illustrates a generalized exemplary hybrid network in accordance with certain embodiments of the present invention.

FIG. 2 schematically illustrates the hybrid network illustrated in FIG. 1 and modified in accordance with certain embodiments of the present invention. Similar to the gateway 104 illustrated in FIG. 1, the video gateway 201 is configured to convert the signals between the different formats used in the packet-switched network 103 and in the circuit-switching network 102. However, in contrast to the known in the art embodiment, the gateway transfers the video call to a service platform 202 operatively connected to the gateway 201. As will be further detailed with reference to FIGS. 3-7, the service platform is configured to receive a video call transferred through the gateway 201, to analyze the in-band information, to recognize a desired destination and to direct the call accordingly. The desired destination may be defined in accordance with destination number and/or short code thereof, and/or in accordance with received DTMF information. Optionally, the desired destination may be further defined in combination with Caller's ID, for example, for providing the same content with different level of service for different user groups.

As will be further detailed with reference to FIGS. 3-7, the service platform 202 is operatively connected to one or more application platforms 203 configured to accommodate one or more applications. When the service platform recognizes the destination corresponding to a certain application platform, it re-directs the video call to the respective application platform which further serves as an end-point for the video call (communication flow 206 from the device 101 to the application platform). The service platform 202 is configured to generate and receive call control signaling on behalf of the application platform(s) 203 at least until a video call is established between the video device and respective application platform. Once a call is established, media is communicated directly between respective application and the user's video device via the video gateway 201 as illustrated by communication flow 207. The signaling of the established call may be transferred in-band and/or via the service platform.

The application platform is further configured to analyze the in-band information of the received video call, to recognize calling user ID and to provide certain services in accordance therewith. For example, application presentation, navigation and/or content thereof may be personalized; the downstream content may be provided with codec/rate parameters in accordance, for example, with the personalized requirements, streaming content and/or capabilities of the calling video device; the content may be provided in a multicast manner if recognized that the called user is a member of certain group, etc.

Optionally, the service platform 202 may be further connected (not shown) to a signaling system of the mobile network, and configured to obtain through this connection information other than that which may be extracted from the video call as, for example, location of the calling user, some characteristics of calling video device, some preferences related to the calling user, etc. The service platform may be further connected (not shown) to one or more $3^{rd}$ party databases, and configured to obtain through this connection information related to the calling user and/or destination number. Such out-band information may be obtained in parallel to the video call with the call signaling or provided per certain request generated by the service platform. The obtained out-band information may be provided to the respective application platform which may provide certain services in accordance with a combination of in-band information extracted from the call and out-band information provided by the service platform.

In certain embodiments of the invention the service platform 202 may be operatively connected to one or more streaming servers 204. As will be further detailed with reference to FIG. 3, the service platform may be configured to enable delivery of streaming content from the streaming server during a period when a user is waiting for an answer by the application platform 203. This streaming content may be provided instead of the standard ring-back tones (ringing, busy, call waiting) and may comprise video clips, advertising content, etc. Such streaming content may be personalized in accordance with destination and/or caller ID.

Note that the invention is not bound by the specific network architecture and/or protocols described with reference to FIG. 2. Those versed in the art will readily appreciate that the invention is, likewise, applicable to any hybrid network facilitating transfer of a video call between endpoints located, respectively, in circuit-switched and packet-switched parts of the hybrid network. In certain embodiments of the invention functionalities of the video gateway 201 and the service platform 202 may be integrated within one device.

Figure 3:
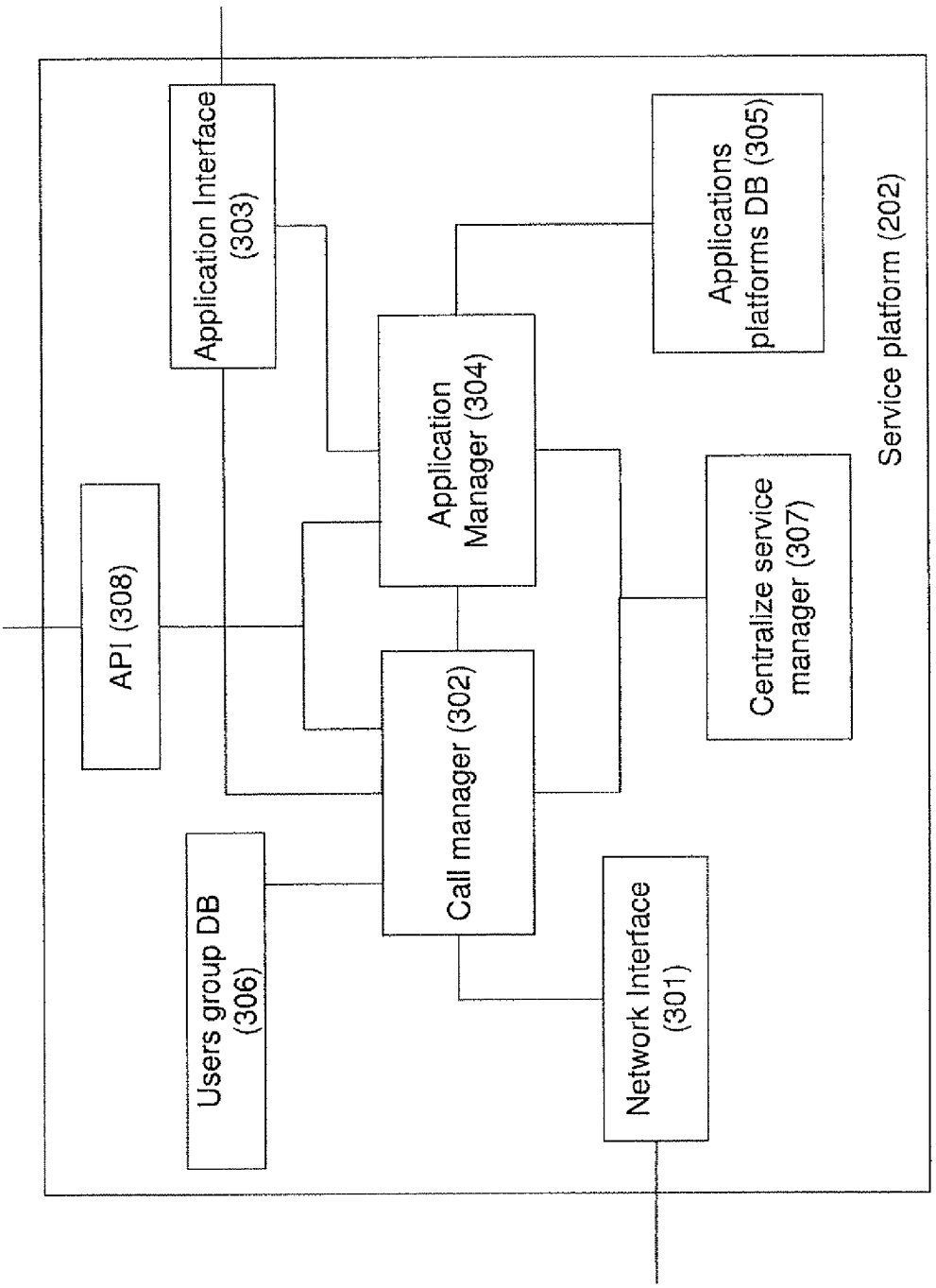
FIG. 3 illustrates a generalized functional block diagram of a service platform in accordance with certain embodiments of the present invention.

Referring to FIG. 3, there is illustrated a generalized functional block diagram of the service platform in accordance with certain embodiments of the present invention. The service platform 202 comprises a network interface 301 operatively connected to a call manager 302. The call manager 302 is further operatively connected to an application manager 304 operatively connected to a database 305 of applications and/or application platforms and to an application interface 303. Optionally the service platform may comprise a database 306 of users and/or user groups operatively connected to the call manager. Optionally the service platform may further comprise a centralized service manager 307 operatively connected to the call manager and to the application manager 304. Optionally the service platform may further comprise an Application Program Interface 308 operatively connected to the call manager 302 and the application manager.

The network interface 301 is configured to receive the video call and to direct it to the call manager. The network interface may receive the video call in different formats (e.g. as IP video over RTP, 3G-324M over IP or otherwise) and is configured to provide all protocol and media conversion necessary for enabling the communication flows in accordance with certain embodiments of the present invention. The network interface may be further configured to recognize a calling user per in-band information and to obtain user-related information via signaling (e.g. user's location, video device capabilities, user's language settings and other user profile data, authorization-related information, etc.) and/or from appropriated $3^{rd}$ parties databases (e.g. information related to user's preferences) and to transfer the received information to the call manager. Some of such information (typically, substantially permanent information) may be further stored in the users/users group DB 306 and retrieved when necessary. Information from a $3^{rd}$ party may be received in a pull mode (e.g. request per recognized user's ID triggered by a predefined event) or a push mode (e.g. if $3^{rd}$ party gets in parallel the information about the received video call and respective user's ID).

The call manager is configured to receive the video call from the network interface and to extract or otherwise recognize the destination information. The destination information includes destination number and/or short code thereof and/or DTMF signals and, optionally, may be combined with caller ID. The call manager is further configured to request the application manager 304 for a destination (application platform and/or application running thereof) corresponding to the recognized destination and about availability of the desired application.

Optionally, the application manager may be configured to register application platforms operatively connected to the service platform and applications thereof. The respective registration information is stored in the database 305. The application manager is further configured to receive (via the application interface) application status information (e.g. alive, available, overloaded, etc.) with regard to the registered applications and to inform the call manager. The application manager may be further configured to calculate and keep a number of available channels to a certain application platform in accordance with capabilities of certain applications and to inform the call manager accordingly.

When the call manager receives the destination and availability-related information from the application manager, it directs the video call (optionally together with supplementary out-band received information) to the desired destination via the application interface 303. The application interface is configured to receive the call (and optional supplementary information) from the call manager and to transfer it to the respective application.

If the application is overloaded, the call manager may contact the streaming server 207 operatively connected to the service platform via API 308 with a request for content delivery during the waiting period. The URL of the streaming server and/or content thereof may be personalized in accordance with destination and/or caller ID and/or out-band information received by the call manager. The call manager may be further optionally configured to enable a certain delay before directing the call to a desired available application, this delay to be used for advertising down streaming to the calling user. Such advertising may be personalized in accordance with destination and/or caller ID and/or out-band information received by the call manager (e.g. user's location).

In certain embodiments of the invention the user may be enabled to move between applications running on different application platforms with no need for terminating the call (e.g. with a help of DTMF navigation). In such embodiments the call manager 302 is configured to pivot the call endpoint from a first application platform to a second application platform while the first application platform remains in the call session. A similar "anchor/pivot" feature is known in the art for VoIP telephony and is disclosed, by way of non-limiting example, in U.S. Pat. No. 6,987,765 (March et al.) entitled "Changing media sessions" and incorporated herewith by reference. In certain embodiments of the invention, moving between applications may be also provided in a manner further detailed with reference to FIGS. 8-11.

In certain embodiments of the invention the call manager may be further configured to generate and keep call records to be further transferred for a billing system via the API 308. The billing-related information may be transferred in real time, per a certain schedule and/or in accordance with predefined events.

The API 308 may be further configured to enable access to the service platform for variable external systems, for example for monitoring, logging, querying and other purposes.

Optionally, the service platform may comprise a centralized service manager 307, configured to provide centralized services for different applications; for example user's identification/authentication in accordance with voice and/or image recognition, access authorization, etc. User-related data necessary for such services may be stored in the database 306.

Figure 4:
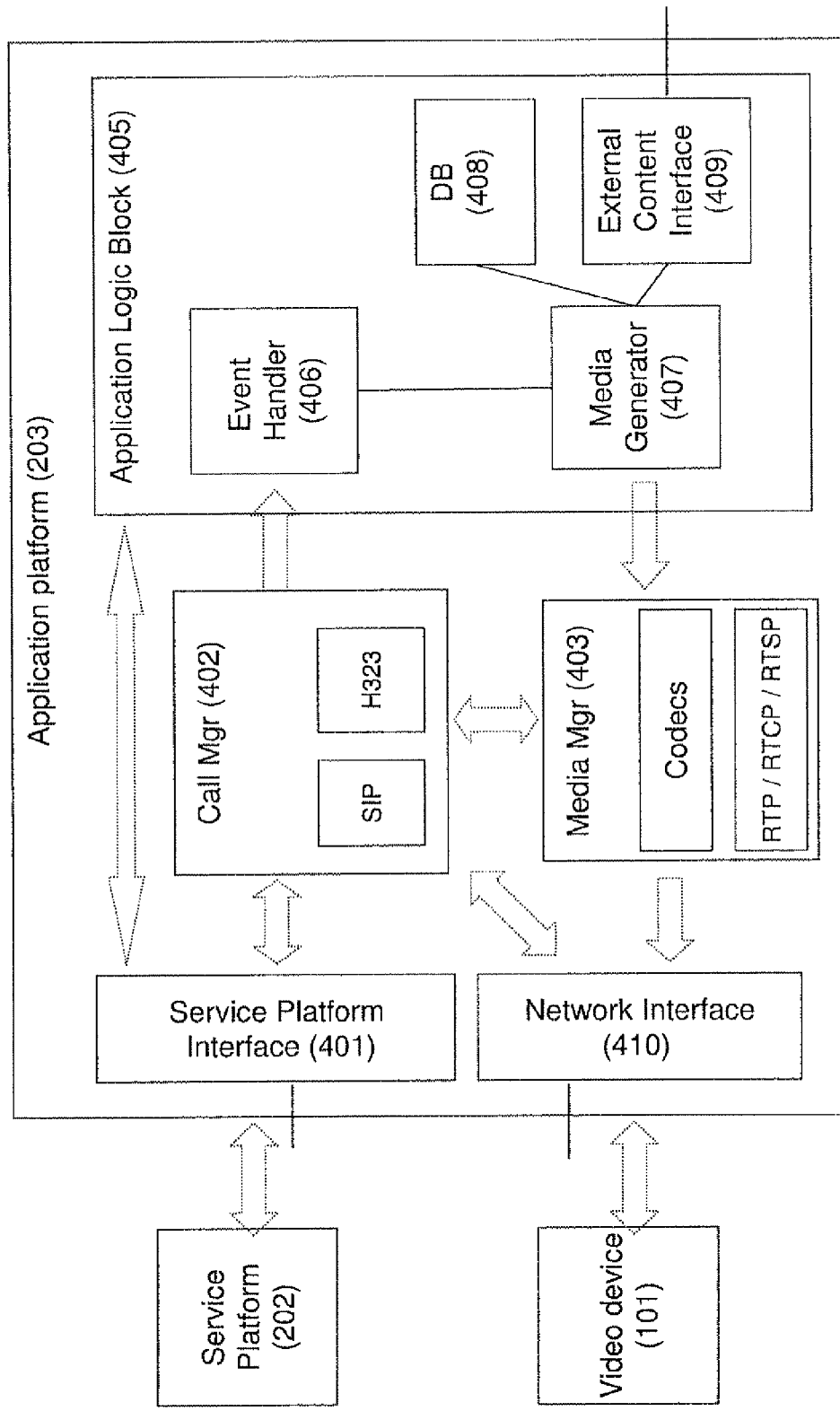
FIG. 4 illustrates a generalized functional block diagram of an application platform in accordance with certain embodiments of the present invention.

Referring to FIG. 4, there is illustrated a generalized functional block diagram of the application platform in accordance with certain embodiments of the present invention.

The application platform 202 comprises a service platform interface 401 operatively connected to a call manager 402 and to one or more application logic blocks 405 further operatively connected to the call manager 402. The call manager 402 is further operatively connected to a network interface 410 and to a media manager 403 further operatively connected to the network interface 410 and to the application logic block(s) 405. The application logic block comprises a media generator 407 operatively connected to an event handler 406 and an external content interface 409. Optionally the application logic block comprises a media database 408 operatively connected to the media generator 407.

The application logic 405 may manage, by way of non-limiting example, interactive video games, multi-user video-games, push-based surveillance applications, real-time data feed, stock-push alert, Mobile Video Communities & Chat, video blog services, mobile dating, video-enhanced contact centers, m-Learning, video mail, and more.

The service platform interface 401 is configured to receive the video call (and optional supplemental information) from the service platform and to direct it to the call manager. The call manager 402 is configured to receive the video call (and optional supplementary information) from the service platform interface and to extract or otherwise recognize the information related to the call and/or to the user. The recognized information may include CallerID number, SIM number, the user profile, location, DTMF signals, etc. The call manager further transfers the recognized information or derivatives thereof to the application logic block 405. In certain embodiments of the invention the application logic block may request the service platform for certain out-band information via the service platform interface. The event handler 406 is configured to handle information related to the calls (e.g. new call, hang-up, DTMF, etc.).

In a case of applications involving upstream media, the call manager further transfers the received media stream to the media manager 403. The media manager is configured to decode the upstream media and to transfer it to the application logic block and, optionally, to the call manager.

The application logic block is configured to provide media corresponding to the recognized information and, optionally, to the upstream media and/or derivatives thereof. The corresponding media may be comprised in the media DB 408 or be generated by the media generator 410. The bookmarks to the respective media may be predefined (e.g. by the user, by the community and/or by content providers, etc.) or generated by the media generator. In certain embodiments of the invention at least part of the providing media may be dynamic and generated per user. When generating a new media, the media generator may connect to one or more appropriate remote systems via the external content interface 409 to retrieve necessary content.

In certain embodiments of the present invention the call manager (or, optionally, the media manager) is further configured to extract data from the decoded video call upstream and to transfer the extracted data and/or derivatives thereof to a respective application.

By way of non-limiting example, the basic operations on up-stream audio include:
  Recording—for later playback;
  Identification and Authentication—identify who is speaking (e.g. from database of voice-prints, confirm if user is who he claims, based on voice print);
  Recognition—Identify key words;
  Control—User speech control over applications;
  Stress analysis By way of non-limiting example, the basic operations on up-stream video include:
  Recording—for later playback;
  Augmented Reality—for augmenting (overlaying virtual objects) real pictures;
  OCR—For applications such as translation, dictionary;
  User Identification and Authentication based on images;
  Location identification—using landmarks, or street signs, application can identify where user is;
  Barcode reading—identify a barcode in the image, read and then present related information;
  Visual search—retrieving information about objects in frame (cover of CD, car brand or even plants)

By way of non-limiting example, respective services may be as follows:
  images received from one or more security cameras and transmitted to surveillance applications; the application may initiate a call to a second user if said data received from a first user fit certain criteria;
  photo of the user transmitted to application for identification/authorization purposes;
  images obtained by a video device (e.g. by embedded camera) and transmitted to a augmented reality application (e.g. such application may receive an image of a modern building and, after processing, downstream the image of said building on a historical background, etc.);
  images obtained by a video device and transmitted to a dedicated server for image processing and further downstreaming the processed/improved images, etc.

The media prepared by the application is transferred to the media manager. The media manager is further configured to receive the media and to encode it for sending to the user's video-device. The application logic block is further configured to generate instructions related to the media downstreaming, and to provide such instructions to the media manager. The media manager is configured to receive instructions from the application logic and/or from the call manager. In certain embodiments of the invention the media-related instructions may be generated in accordance with received user-related information (e.g. instructions with regard to downstream compression format(s) in accordance with capabilities of user's video device, instructions with regard to service level of downstreaming in accordance with user's belonging to a certain user group). Optionally, the encoding may be provided in accordance with user-related information available for the application logic block as, for example, user's preferences, requirements, capabilities of the video-device, etc.

The instructions to the media manager may further include, for example, real-time insertion of targeted advertising into multiple simultaneous content streams, special multiplexing enabling content overlay (e.g. in "put text over video" applications, etc.), operations related to interaction between several applications running on the same application platform, and others.

In certain embodiments of the invention the downstream may be provided in a manner personalized for different cellular phones. By way of non-limiting example, the service platform may receive from initiating a call cellular device series of H245 messages mixed into an H223 stream. The H245 messages include vendor identification and model identification strings which provide the information required to detect the specific model and version of the calling device. The media manager 403 may be configured to comprise a database of known device issues and a filtering module (not shown). The information about the cellular device is cross referenced with said database, and if a match is found the filtering module is enabled for the duration of this call. The filtering module enables providing the downstream adapted to the calling device.

Furthermore, in certain embodiments of the invention, all signals (control and media) sent from the cellular phone to the service platform may passed to the filtering module for manipulation if required. All signals (control and media) sent from the application to the device may be similarly passed through the filtering module before being transmitted to the device. The filtering module may use the list of device known issues to "correct" packets before transmission. By way of non-limiting example, if certain cellular phone models duplicate (as may happen in practice) the H245 UserInputIndication message, the filtering module removes the duplicate event notifications sent from the phone and sends only a single event indication to the application. This may resolve the double-clicking effect known in the art for video services provided for said certain cellular phone models.

The network interface 411 is configured to receive downstreaming content from the media manager and to provide all protocol and media conversion necessary for enabling the communication flows in accordance with certain embodiments of the present invention. Some of such protocol and/or media conversion may be provided in accordance with instructions received from the call manager (e.g. instructions to start multicast of certain content if there is achieved a certain number of calls requesting certain content during a certain period of time, etc.).

In certain embodiments of the invention the application logic block may be further configured to initiate video call to one or more users. The call may be pre-scheduled or initiated in accordance with a certain event. The event may be generated by the application (e.g. news alerts application), by a user (e.g. in a callback application), and/or by combination thereof (e.g. one user invites another to join a multi-user application). This makes it possible to provide push services such as wake-up calls, traffic updates, sending greetings, location based advertisement videos, etc.

Figure 5:
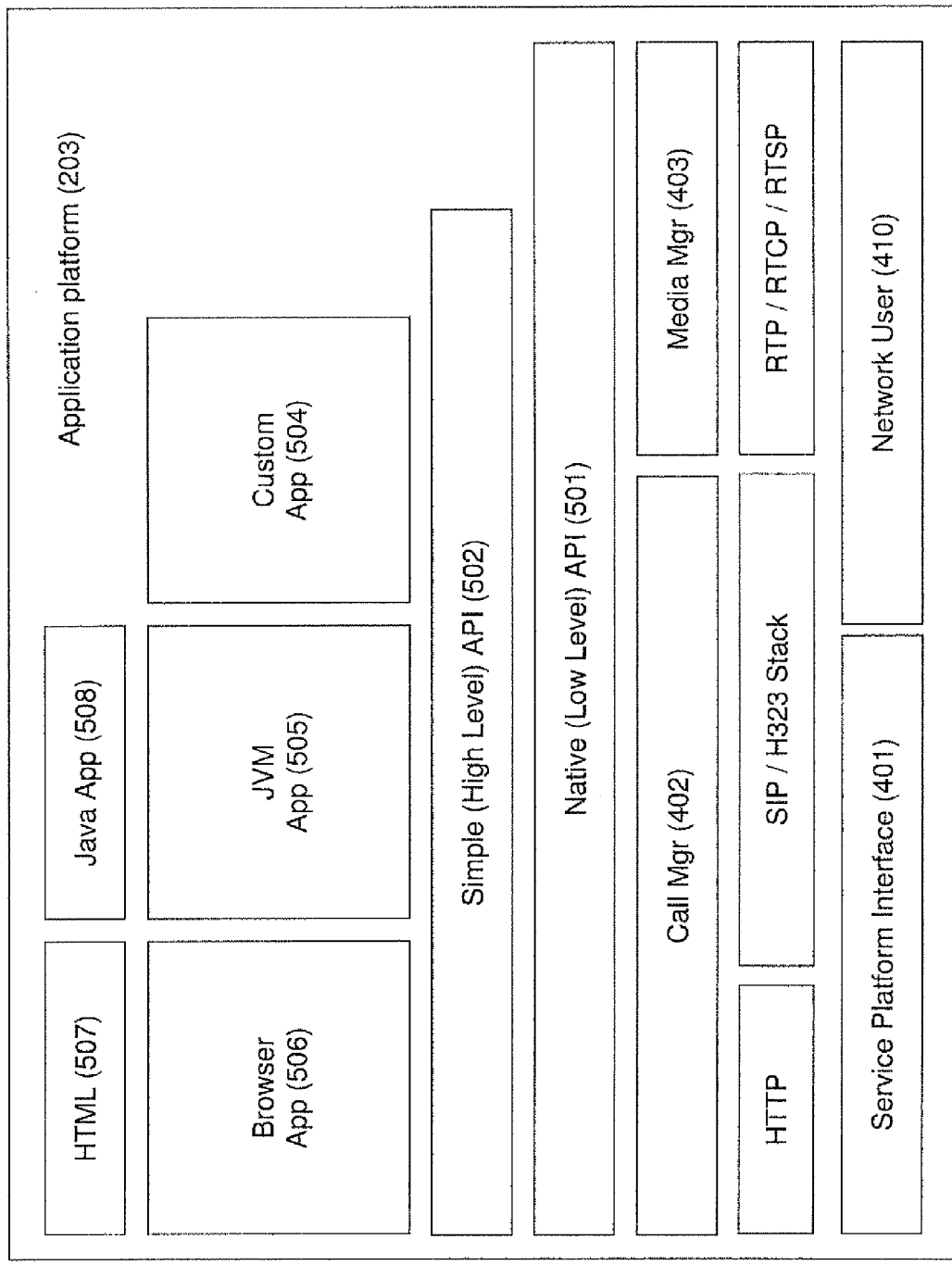
FIG. 5 illustrates a generalized logical block diagram of a framework for application development in accordance with certain embodiments of the present invention.

Referring to FIG. 5, there is illustrated a generalized logical block diagram of a framework for application development. In accordance with certain embodiments of the present invention, the application platform 203 may be configured as a framework for plug-in application developers. The framework comprises several logical levels enabling network and content functionalities necessary for providing services by developed application (504) in accordance with certain embodiments of the present invention:

Low level communication interfaces (service platform interface 401 and network interface 410);
Protocol stacks level (e.g. HTTP, SIP/H.323 stack, RTP/RPCP/RTSP, etc.);
Logical level comprising the call manager 402 responsible for handling calls in various protocols and transferring events to higher levels, and media manager 403 responsible for running codecs, processing up/down stream media and other functions detailed with reference to FIG. 4;
Native (low level) API (501) allowing application to receive incoming calls, generate outbound calls, receive and respond to signaling events, receive and send media, etc.;
High level API (502) providing simplified set of necessary functions and callbacks for application development in high level languages.

Both high level and low level APIs may be accessed from different programming environments such as, for example, C++, .NET or Java. The higher API represents a higher/simplified level of interaction; simplifying things for applications developer (e.g. API 501) would use SaveVideoToFile( ), while low level API would start with GetFrameBuffer( )).

Optionally the framework may have a library of prepared applications as, by way of non-limiting example, a browser application (506) which enables rendering HTML to Video; JVM application (507) which enables running Java applications and rendering graphics to video stream; Java application (508) to be used, for example, for multiplayer games, etc.

For purpose of illustration only, FIGS. 2-5 were described with respect to configuration wherein the service platform and the application platform are separate network entities. Those skilled in the art will readily appreciate that the teachings of the present invention are not bound by such configuration and are applicable in a similar manner to any configuration with equivalent and/or modified functionality combining the entities and/or functions thereof in another manner.

Those skilled in the art will also readily appreciate that the invention is not bound by the configuration of FIGS. 2-5; equivalent functionality may be consolidated or divided in another manner. In different embodiments of the invention the blocks and/or parts thereof may be placed in a single or in multiple geographical locations (including duplication for high-availability); operative connections between the blocks and within the blocks may be implemented directly or indirectly, including remote connection. The connection may be provided via Wire-line, Wireless, cable, Internet, Intranet, satellite or other networks and/or using any appropriate communication standard, system and/or protocol and variants or evolution thereof. The invention may also be practiced in distributed computing environments. The network entities may be implemented in a stand-alone form as well as be fully or partly integrated with different devices, including 3rd party equipment.

Those skilled in the art will also readily appreciate that the data repositories may be consolidated or divided in other manner; some of these databases may be shared with other systems, including 3rd party equipment.

Figure 6:
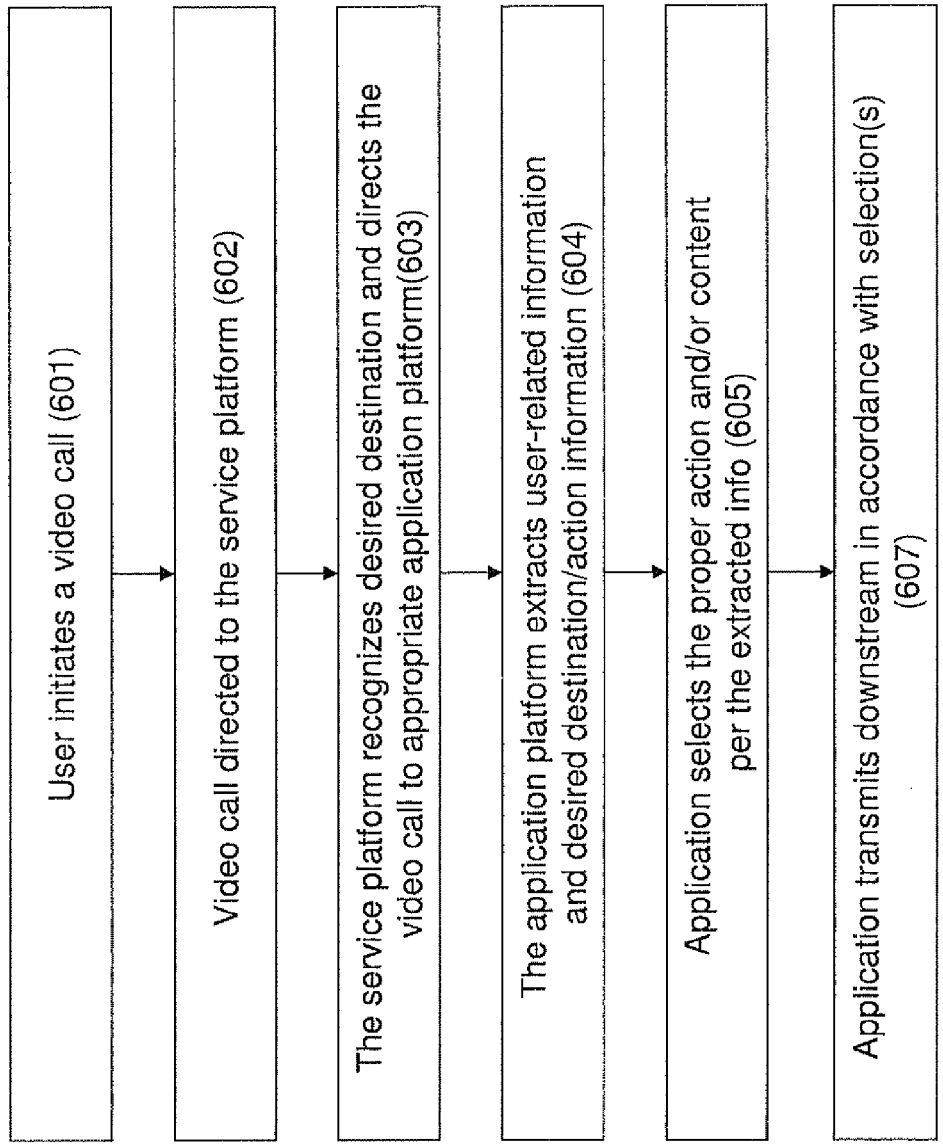
FIG. 6 illustrates a generalized flow diagram of operating a pull video call service in accordance with certain embodiments of the present invention.

FIG. 6 illustrates a generalized flow diagram of operating a pull video call service in accordance with certain embodiments of the present invention. A user initiates a video call 601 which is directed 602 to the service platform via the video gateway, bridging the circuit-switched and packet-switched parts of the hybrid network. The service platform recognizes the desired destination and re-directs 603 the call to a respective application platform (optionally, together with supplemental out-band information). The application platform extracts 604 user related information and desired destination information, including desired bookmark, and provides it to the respective application running on the application platform. In accordance with received information, the application selects 605 proper action (e.g. generating, requesting and/or converting, rendering, streaming, overlaying or other actions required to appropriate media) and/or content to be provided and communicates 606 the respective content to the user's video device. The two-way communication established between the video device and the application platform enables providing interactive video-based applications, wherein the user may provide instructions (e.g. via DTMF, voice commands and/or upstream media) and the application platform provides download of the respective media. The download may be provided in different forms as, for example, direct content streaming, content rendering, content multiplexing, content overlaying or otherwise. The download may be provided in one-to-one, one-to-many and combined modes, in a combined mode part of the content. In the combined mode the video stream may be provided in one-to-many mode, while, for example, an overlaid part of the content may be personalized and provided in one-to-one mode, wherein the two streams may be multiplexed by the gateway 201 or by a media player embedded in the video device.

Figure 7:
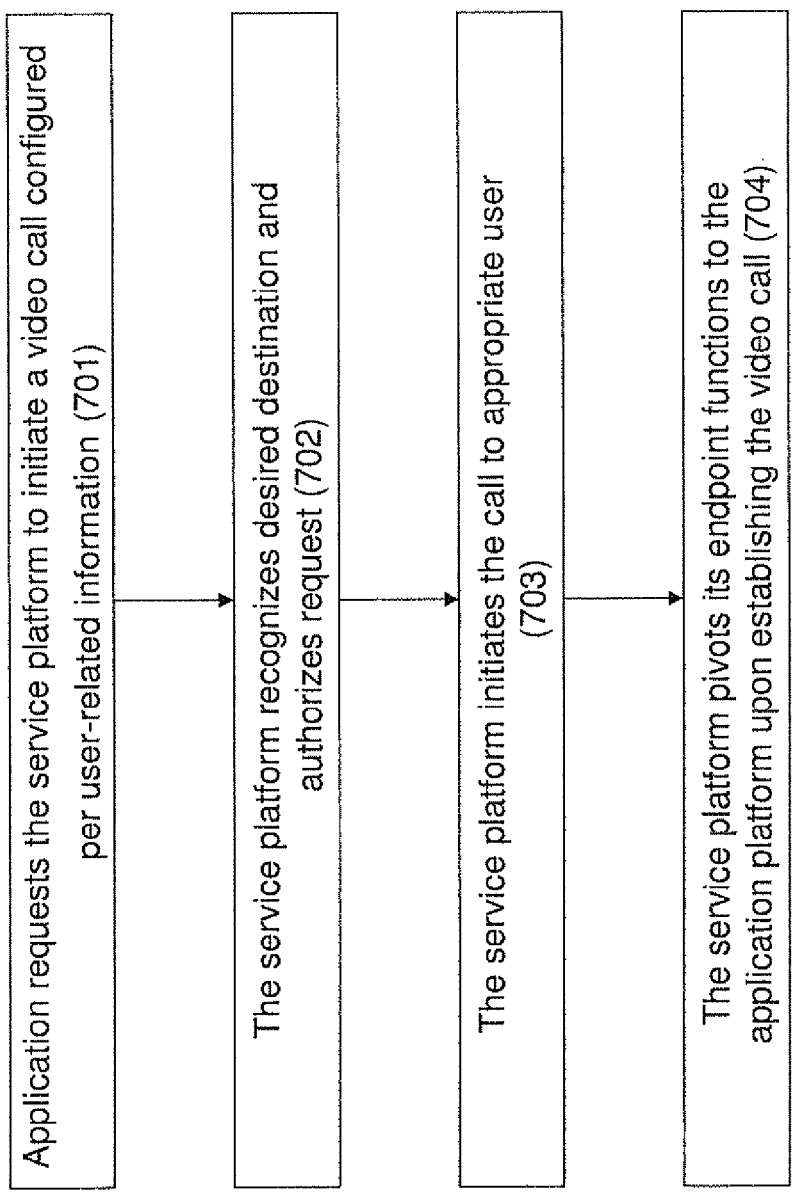
FIG. 7 illustrates a generalized flow diagram of operating a push video call service in accordance with certain embodiments of the present invention.

FIG. 7 illustrates a generalized flow diagram of operating a push video call service in accordance with certain embodiments of the present invention. The application requests (701) the service platform to initiate a video call to one or more users. Such a request may be pre-scheduled or initiated in accordance with a certain event generated by the application or by a user. The service platform recognizes the application and the desired destination and authorizes (702) the request (e.g. the application manager 304 verifies if a certain application is authorized for push services at all and to a certain destination). Upon authorization, the service platform initiates (703) the call to appropriated video device and pivots (704) the endpoints functions to the application platform upon establishing the call. Once the call is established, the application platform communicates the respective content to the user's video device.

As was detailed with reference to FIG. 3, the user may be enabled to move between applications running on different application platforms with no need for terminating the call. The "anchor/pivot" feature disclosed, for example, in U.S. Pat. No. 6,987,765 (March et al.) allows "pivoting" a call already established between a first endpoint and a second endpoint to a third endpoint while keeping the first endpoint 4"anchored" to the call. In this case, the first endpoint is not aware that the call has been pivoted, and no new call setup signaling is required. The ability to transfer (pivot) calls from one endpoint to another disclosed by March may be implemented, for example, for providing automated announcement service, however, it is not sufficient for interactive audio/video services. In accordance with certain embodiments of the present invention, as further detailed with reference to FIGS. 8-11, the call meta-data is transferred along with the transferred call as a "call token", thus enabling complete seamless user experience. Using the tokens allows building complex video application while maintaining "call state" when transferring calls between end-points, from an endpoint to the service-platform, or from the service-platform to an endpoint. Moreover, this allows encapsulating common tasks as generic applications that may be re-used in multiple services (for example an application that requires the user to login to a system using voice and face recognition). To use these applications, the call is transferred to the building-block application along with any required meta-data. When done, the application can transfer the call and any additional meta-data back to the service-specific application.

Among advantages of such embodiments is the ability of distributing the service components. In contrast to a common practice of building audio and/or video services with a centralized engine (even if logic is drawn from a VXML server and media is provided from a media server), the "call tokens" of the present invention allow true distribution of a plurality of applications, which may run as part of the service-platform, next to the service platform, and/or on a remote system—whichever deployment is more appropriate for the task.

In accordance with certain embodiments of the present invention, required meta-data may be transferred along with a call when transferring the call from one application to another, and/or from the application to the service-platform, and/or from the service-platform to the application.

For purpose of illustration only the following description is provided with reference to SIP protocol. Those versed in the art will readily appreciate that the invention is, likewise, applicable to H323 or any other appropriate protocol.

Figure 8:
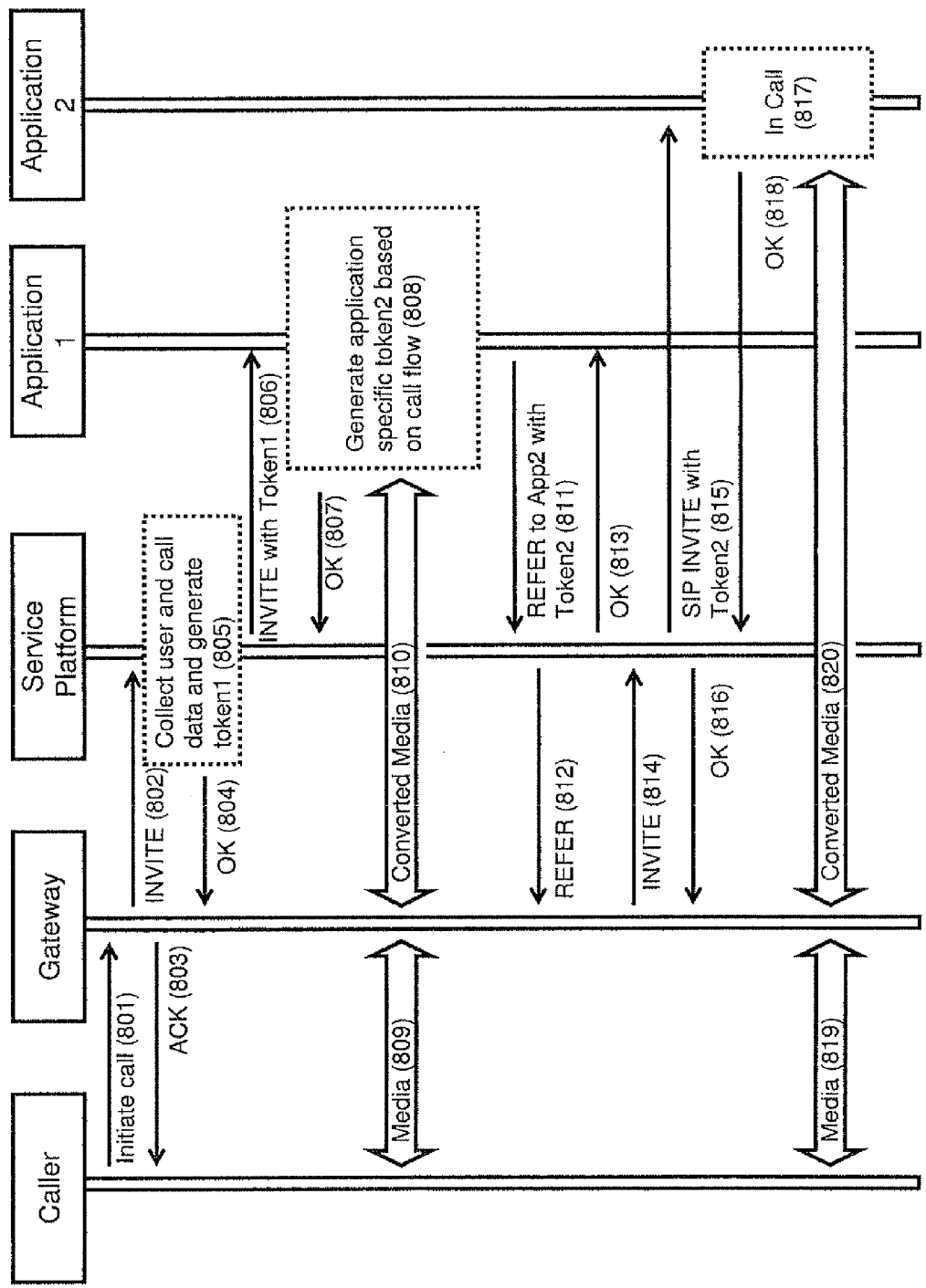
FIG. 8 illustrates a generalized message flow of transferring a call between two applications with meta-data tokens in accordance with certain embodiments of the present invention.

Referring to FIG. 8, there is illustrated a generalized message flow of transferring a call between two applications in accordance with certain embodiments of the present invention. In SIP transferring, a call is achieved by sending a REFER message. The refer-to header indicates the recipient address which is derived by the framework from item 1. Next, the REFER message is provided with an Alert-Info header with an encoded string representing either the application meta-data, or a database unique key which may be used to retrieve the meta-data from a database.

Although SIP supports sending generic messages using a message of type MESSAGE, in accordance with certain embodiments of the present invention, it is crucial that the meta-data be transferred together with the call, as opposed to using a separate message or protocol. This ensures that the receiving application will have all required data when the call arrives without having to synchronize between the call signals (SIP protocols), and other proprietary protocols. In addition, provided piggy-backing on the SIP protocol, and the Alert-Info header allows for easier traversal of firewalls, SIP proxies, and other network entities which may cause network connectivity issues.

Figure 9:
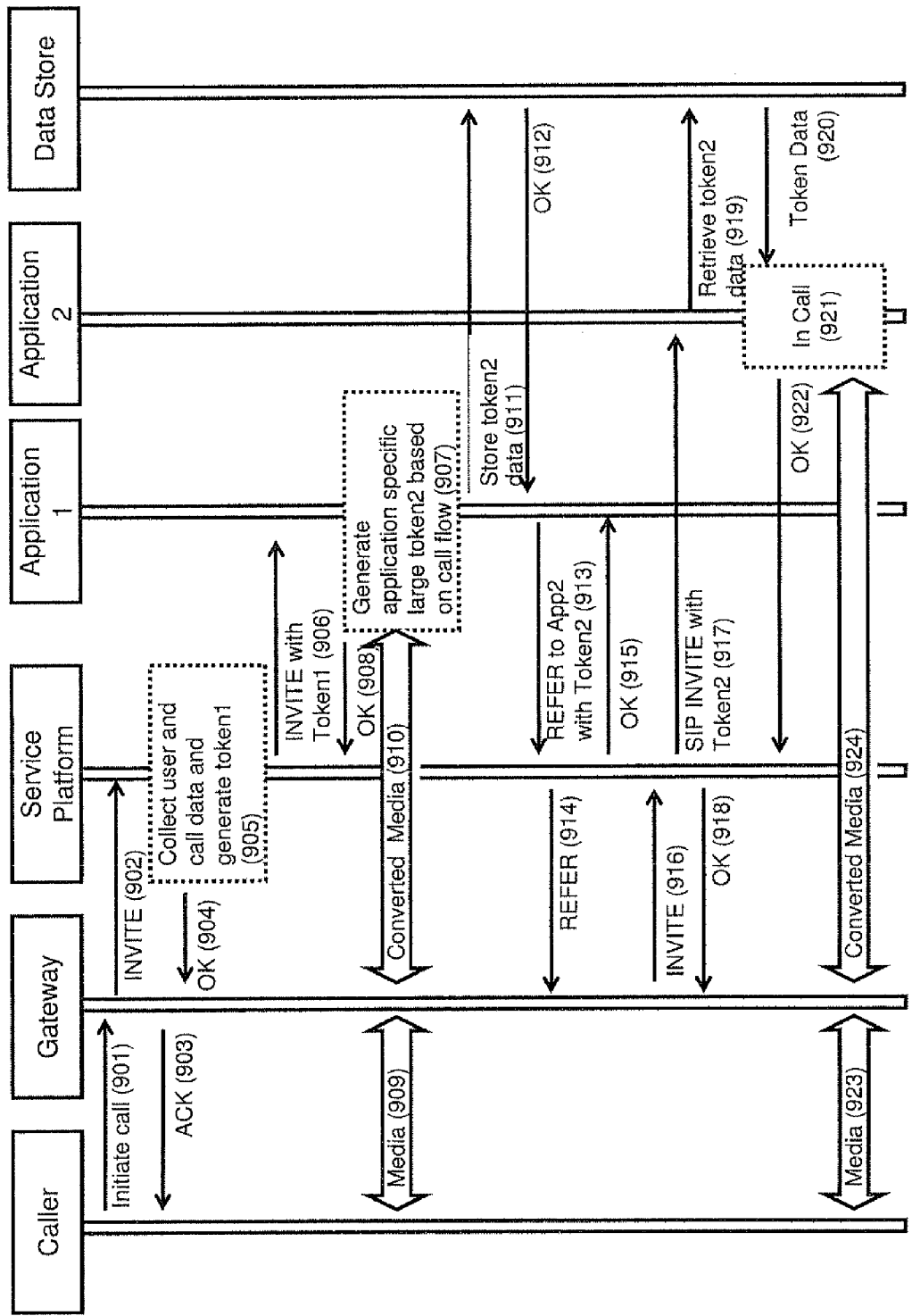
FIG. 9 illustrates a generalized message flow of transferring call between two applications in accordance with certain embodiments of the present invention for large amounts of meta-data.

FIG. 9 illustrates a generalized message flow of transferring call between two applications in accordance with certain embodiments of the present invention wherein the amount of meta-data is too large to be encoded in the SIP message header. In such cases the meta-data are serialized to a string (e.g. XML, base64 coded binary, etc.), and stores the resulting string in a database. A unique key is created in order to access the meta-data string. This unique key is further used as the value of the Alert-Info header. The database may be a remote database with a web-service interface accessible to applications regardless of their physical location. This may allow to build distributed services where some of the applications are hosted outside of a local network.

The token-generation/transferring capabilities may be configured as a part of the application framework. The applications will use TransferCall capabilities provided by the framework in order to initiate the transfer process. An application developer need to provide a) a destination application or service and b) meta-data to be sent to the receiving application, so the call may be transferred between the applications/service platform accordingly.

Figure 10:
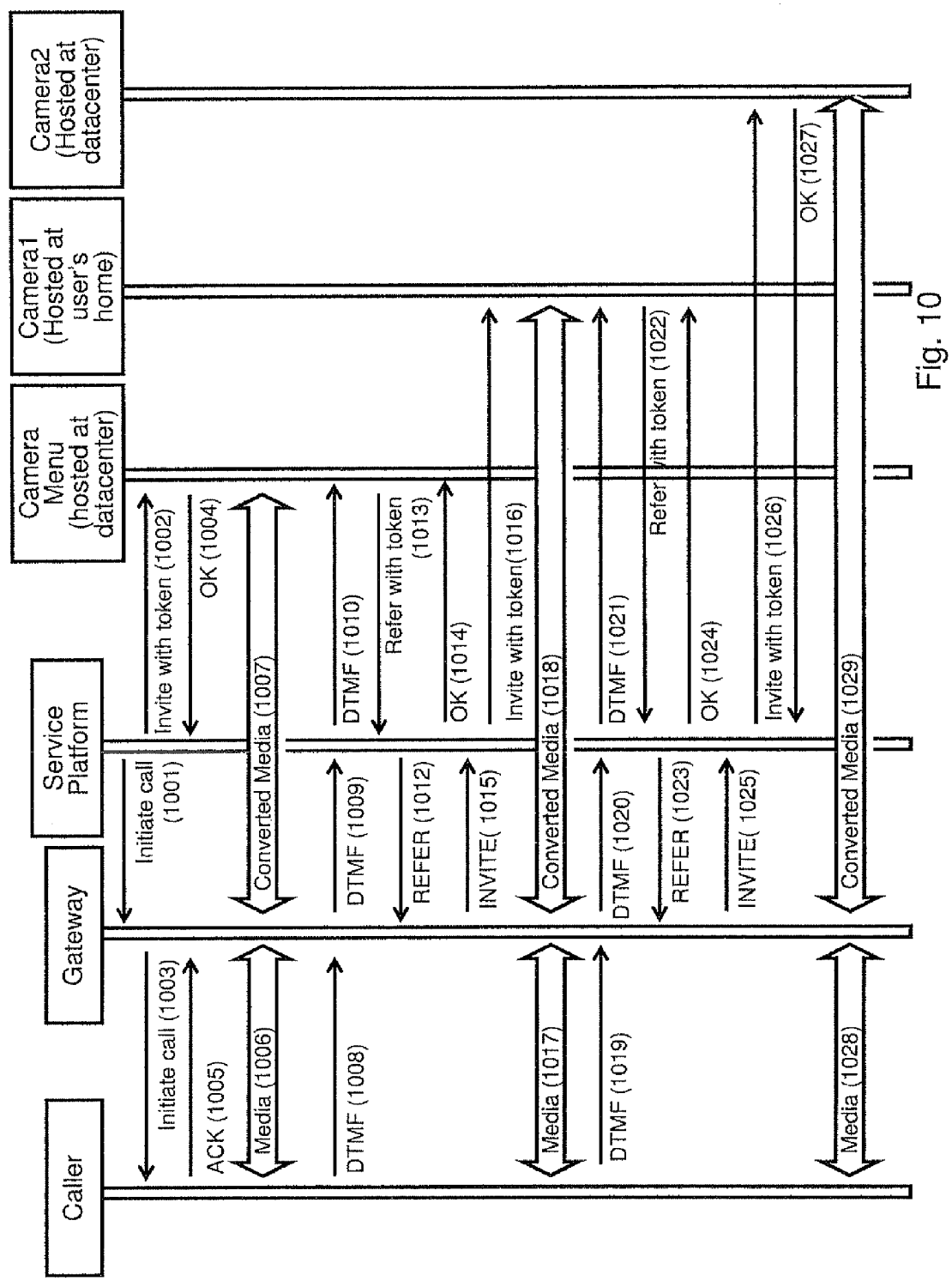
FIG. 10 illustrates a non-limiting example of a distributed service in accordance with certain embodiments of the present invention.
Figure 11:
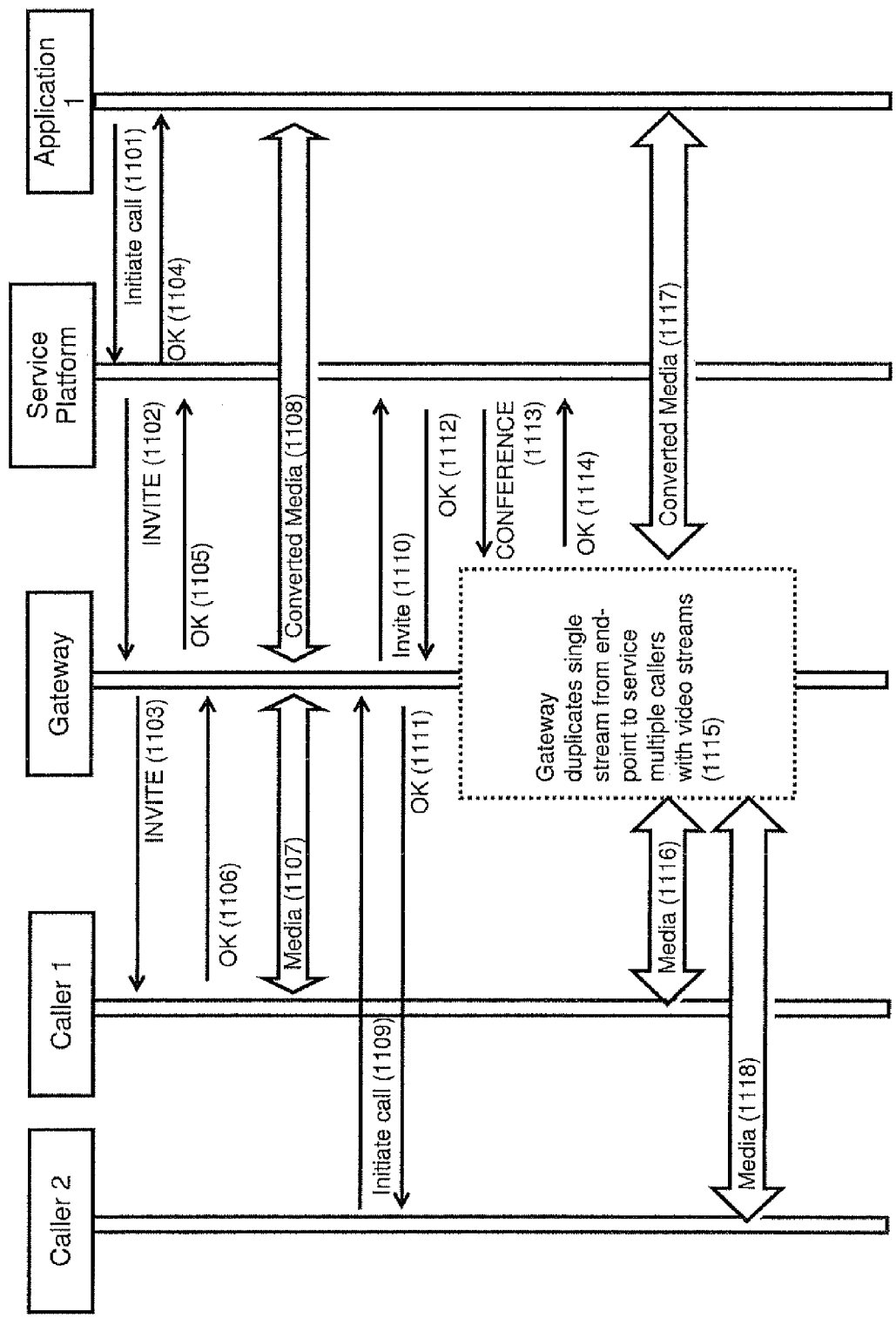
FIG. 11 illustrates a non-limiting example of a multi-caller application in accordance with certain embodiments of the present invention.

FIG. 10 illustrates a non-limiting example of a distributed service using two applications hosted in datacenter and one application running on home computer; and FIG. 11 illustrates a non-limiting example of a multi-caller application wherein the Service Platform handles multiple callers to single end-point and the Gateway duplicates single stream to multiple media streams—one per caller. In such a case, the Service platform will detect that Caller2 is requesting the same camera as Caller1. Instead of forwarding the 2nd call to the camera, it will use the media stream available from the first call, and retransmit this stream to both callers. This reserves bandwidth on the application (SIP end-point) side, which is very important in cases where the end-point is on a slow WAN connection. The service platform needs to manage all 3 call legs, while each end-point is not aware there are more than two end-points in the call.

As illustrated in FIGS. 8-11, the REFER message sent by the application is received by the Service Platform which first checks the refer-to header and determines if the destination is a 2nd application, or a feature provided by the Service Platform itself. In case of the former, it will send a SIP INVITE message to the destination application and copy the Alert-Info header from the REFER message to the INVITE message. In this case, the value of the meta-data is not important to the Service Platform. Accordingly, application developers may encode any type of serializable meta-data they wish to transfer between their applications, without requiring the framework and/or the service platform for support and modifications.

When the refer-to header indicates functionality available by the Service Platform itself, the Service Platform firsts decodes the message token to retrieve the meta-data in order to perform the required functionality. When done, the Service Platform transfers the call back to the sending application, or to any other application specified in the meta-data. This allows to build complex services using multiple applications as building blocks which transfer the call between themselves.

For purpose of illustration only, the following description is provided with reference to applications created with the help of the application framework. Those versed in the art will readily appreciate that the invention is, likewise, applicable to any application configured in accordance with teachings of the present invention.

The application receiving the transferred call will receive an INVITE message with the Alert-Info header noted above. The framework automatically decodes the message header, and, if needed, retrieves the meta-data from the database. The framework then passes the available information to the application together with the notification that a new call has been answered. As the meta-data arrive together with the call, the application is capable to handle the call based on the information comprised in the meta-data (e.g. to play a movie in accordance with a movie name comprising meta-data received from another application). As noted above, the framework does not need to have an understanding of the meta-data, thus application developers may encode any type of application specific data without requiring framework modifications.

One of the problems of implementing video-call based services is latency between the sent packets and real playback. In IP telephony (voice and/or video) it is customary to use Jitter buffers in order to deal with packet jitter (variation in transfer time) which cause the playback to "jump". Common Jitter Buffer implementations require the receiving endpoint to enter received packets into a buffer (queue) when they arrive. Packets are then removed from the buffer in precise timing required for smooth playback. Variation in transfer time of the packets to the receiving endpoint is no longer a problem, as the player always has available packets in the buffer waiting for playback. Out-of-order packets are also easily put into their correct position in the sequence by the buffer without affecting the playback. Using Jitter buffers requires the average transmission rate of packets sent from the media source to be the same as the playback rate. A rate too high will cause the buffer to overflow, a rate too low will cause delays ("jumps") in the playback. As the packet usually spends a significant amount of time in the buffer (200 ms-5000 ms), a side effect of using the jitter buffer is constant latency between when the packets are sent and actual playback.

Figure 12A:
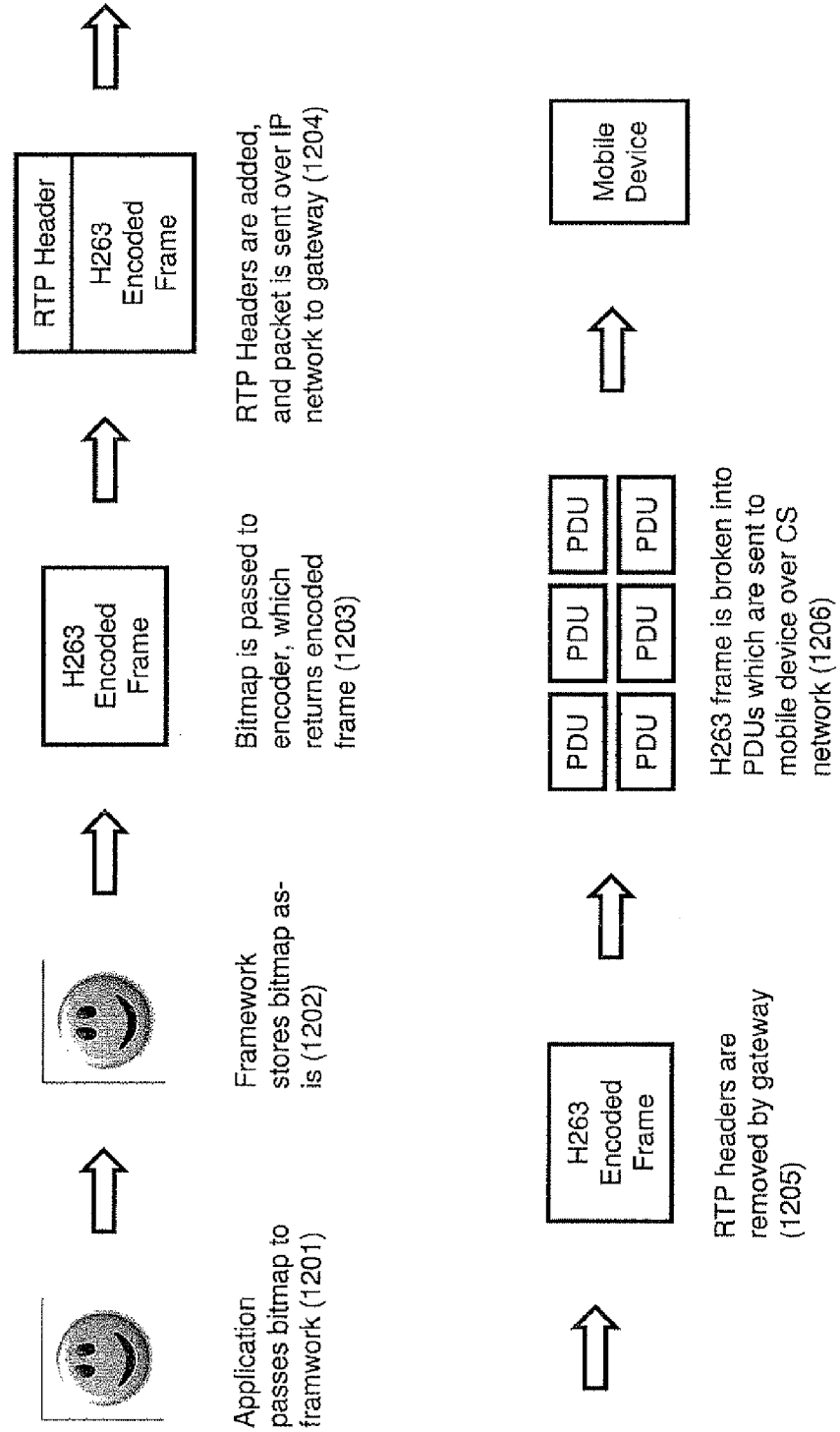
FIG. 12a illustrates a schematic path of a video frame from an application to a cellular phone as known in the art.
Figure 13A:
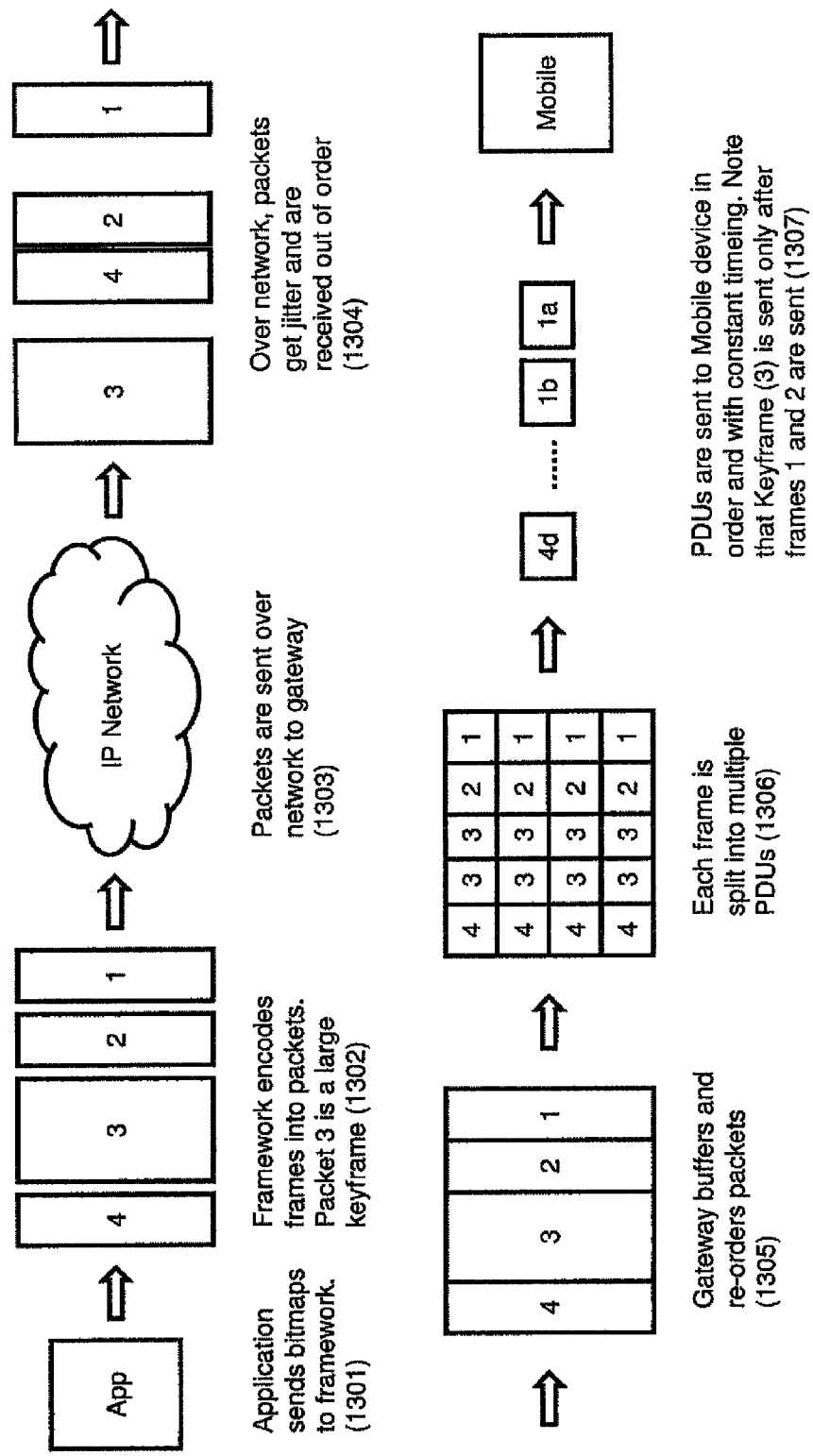
FIG. 13a illustrates operating jitter buffers when passing video frames from an application to a cellular phone as known in the art.

FIG. 12a and FIG. 13a illustrate a schematic path of a video frame from an application to a cellular phone and respective operating jitter buffers when passing the video frames as known in the art. H263 protocol encoded video stream in a sequence comprises two types of frames: key-frames and non-key-frames (delta) frames. A key-frame is a frame that encodes all the required data in order for the decoder and player to successfully display the frame. A non-key-frame encodes only changes from the preceding key-frame, and is therefore much smaller (requires less bits); however it can only be displayed if the player previously decoded the corresponding key-frame. Non-key-frames enable to lower the video stream bit-rate. However, if a key-frame is received with an error, then all following non-key-frames are useless as they depend on decoding of the corrupted key-frame. Therefore a reasonable ratio between key-frames and non-key-frames is required, this ratio depends on a transport method.

In video, key-frames are, generally, generated when a scene changes. In such frames the difference between the scene-change frame and the previous key-frames is large (background changes), therefore the advantage (measured by the number of bits) in encoding the frame as a non-key-frame is minimal.

Figure 12B:
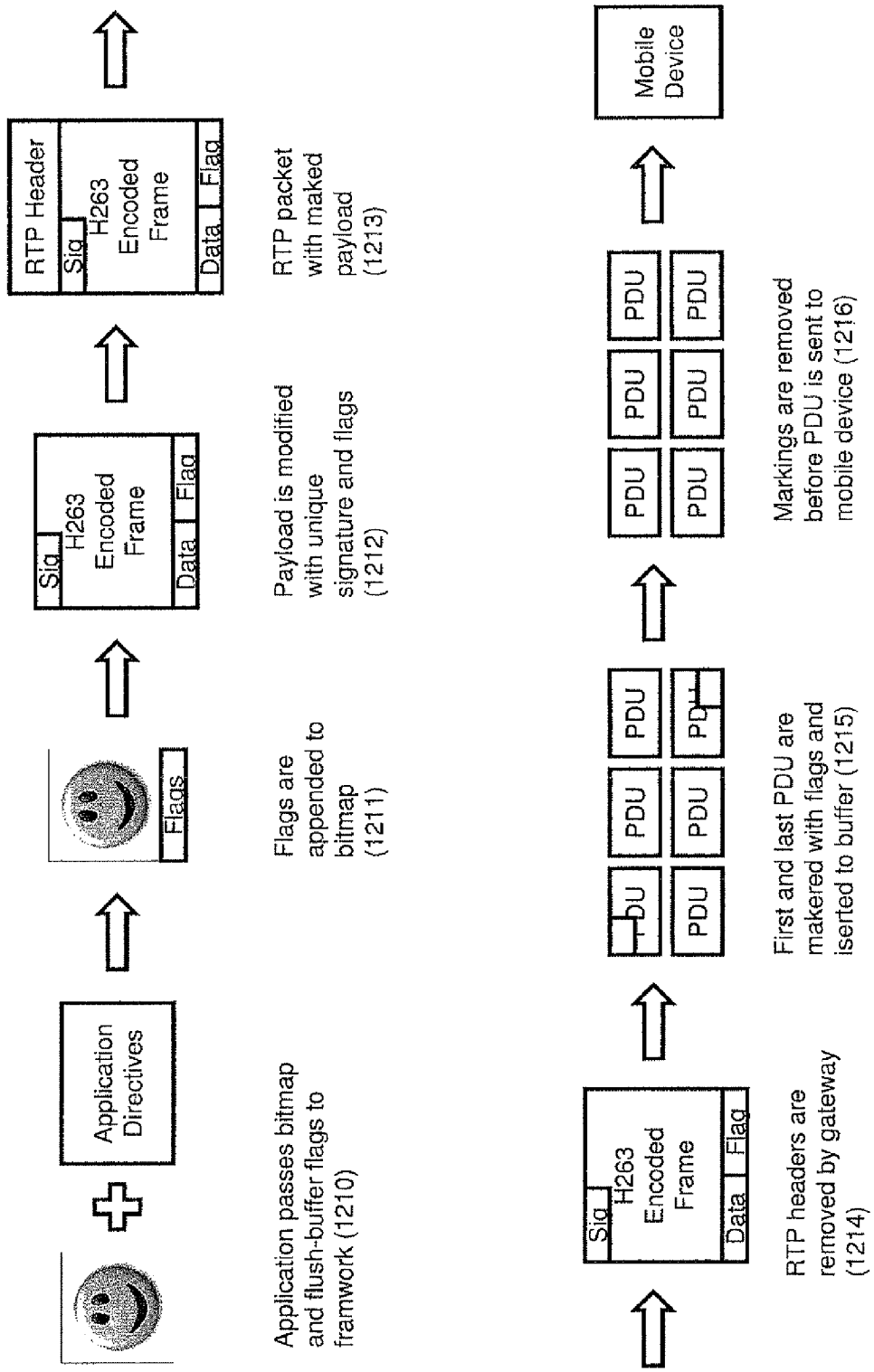
FIG. 12b illustrates a schematic path of the video frame from an application to a cellular mobile device in accordance with certain embodiments of the present invention.
Figure 13B:
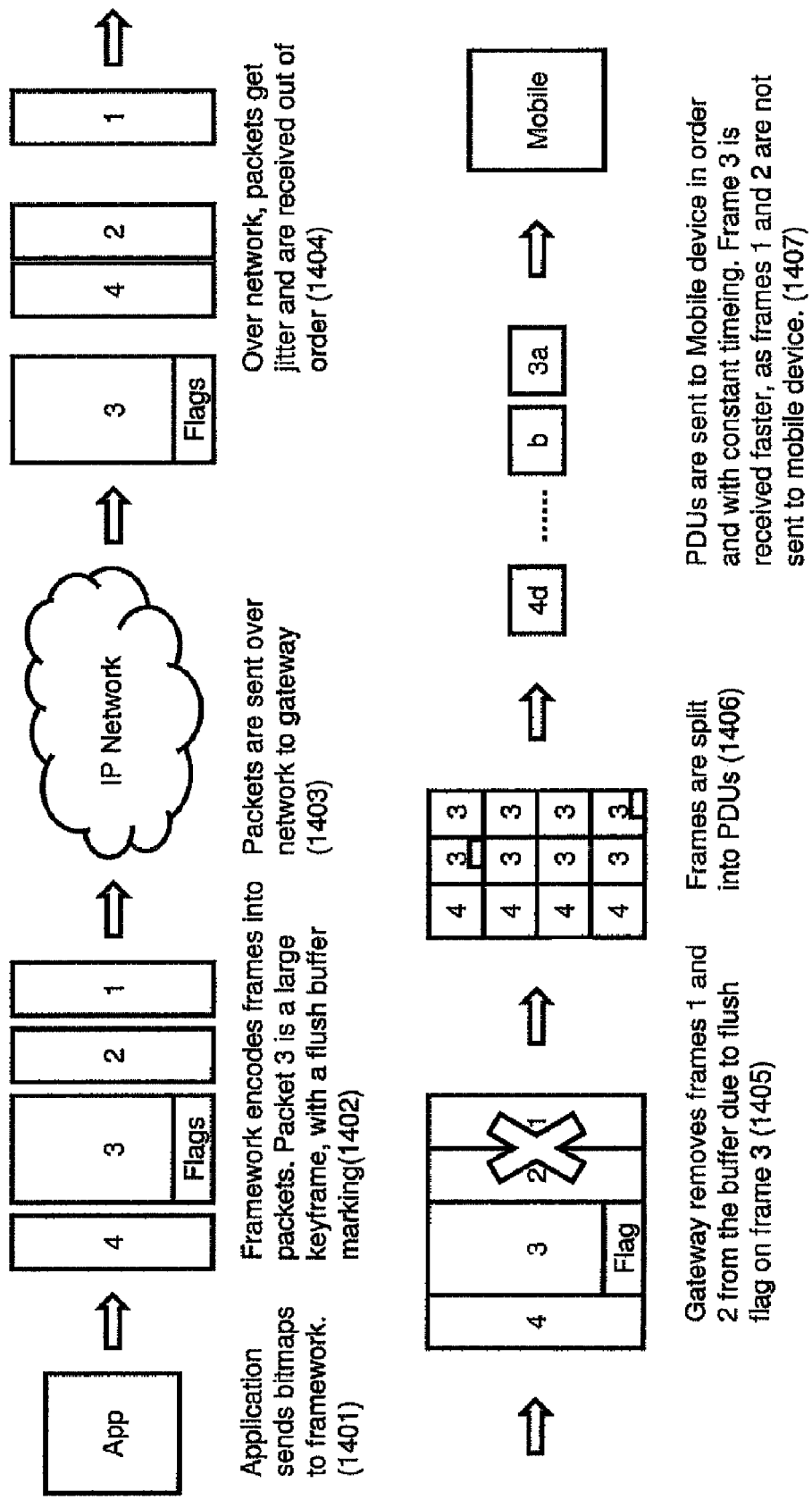
FIG. 13b illustrates operating jitter buffers when passing video frames from an application to a cellular phone in accordance with certain embodiments of the present invention.

Referring to FIGS. 12b and 13b, there are illustrated a schematic path of the video frame from an application to a cellular device and respective operating jitter buffers when passing the video frames in accordance with certain embodiments of the present invention. The video frames are generated by the application which draws frames into a virtual display. The .Net framework then samples this virtual display and provides a bitmap to the lower level. The bitmap is then fed into an H263 encoder which produces encoded video packets (key-frame or non-key-frames). These packets are wrapped with RTP headers and sent over the network to the service platform. The service platform receives the RTP packets, removes the headers and queues the payload in a jitter buffer. The video frames are then read from buffer, and broken into PDUs (protocol data units) in size appropriate for Circuit Switch transmission. The packets are then queued again for transmission before sending to the mobile device over the CS network. Transmission over the CS occurs at precise timing with a bit rate of 64 kb/s.

In accordance with certain embodiments of the present invention, there is provided a method allowing an application to signal to the framework and service platform that a given frame is a good frame to encode as a key-frame. The application is further capable to request that this frame be delivered as fast as possible to the mobile device, while flushing (clearing) all intermediate jitter buffers. Flushing may be provided for only audio buffers, only video buffers, and both audio and video buffers, as required by the application.

In cases when the user is usually interested in a quick system response which may result in a scene change (e.g. when responding to DTMF events triggered by the user) the provided method may be of special importance. In such cases flushing the buffers will reduce latency, wherein the "jump" in playback caused by the flushing shall not be a problem since the scene change was expected. For example, when the users key their choice in a displayed menu screen, they expect the video to "jump" to a new scene. By way of another non-limiting example, while viewing a slide-show with background music, the users wish the video to be updated as fast as possible with no "jump" in the audio. Accordingly, for such applications only the video buffers will be flushed, without flushing the audio buffers.

In order to avoid complex synchronization issues, the information regarding each frame (key-frame, flush buffers, etc.) shall be delivered together with the frame, without using a $2^{nd}$ channel, from the moment the frame leaves the application, within the framework layers, over the network as RTP packets, and inside the service platform till the packet is sent to the mobile device.

Configuring a frame as key-frame and/or flushing the jitter buffers may be provided by variety of heuristic methods. For example, when developing an application in HTML, the framework will generate a new key-frame and flush video buffers every time a new HTML document is loaded; implementing JavaScript will provide explicit instructions as "request a video key-frame" and "flush the video/audio buffer"; intermediate .Net abstraction layer will provide Boolean flags allowing the application (or higher framework layer) to set such flags.

The low level framework samples bitmaps from the layer above at a constant rate. Each time a bitmap is sampled, the same sampling code also samples the values of the above flags. If a key-frame is required it notifies the encoder the next frame should be encoded as a key-frame. After the RTP frame is returned from the encoder, the framework modifies the payload as follows: The first k bytes of the payload are replaced with a unique signature identifying the payload as "marked". The values of the requested flags, as well as the original bytes from the beginning of the payload are then appended to the end of the payload. The RTP packet headers are updated with the new payload size. Marking packets in this manner allows RTP packets to be transferred as normal over the network. This is important because the network path between the application+framework and the service platform is not entirely in one domain (e.g. the application may be hosted on a remote server).

When the RTP packets are received by the gateway, the RTP headers are stripped from the packets, and the packet is inspected for the unique marking signature. If such signature is detected, the values of the Boolean flags at the end of the payload are read. If indicated by the flags, the gateway flushes any required buffers before inserting the payload into the buffers.

The H263 payloads are then removed from the buffer in order to be queued from transmission over the CS network. Before splitting the packet into PDUs, again the packet is inspected for the unique signature. If found, the Boolean flags at the end are read, and the packet is restored to its original payload. The buffers are flushed according to the flags before inserting the PDUs into the transmission queue.

Flushing the buffers as described above may lower the latency from 1-2 s to 0.5 s, depending on the size of the key-frame.

Note that the teachings of latency reduction for video calls detailed with reference to FIGS. 12-13 are not bound by the specific network architecture and/or configuration of certain network elements (e.g. service platform, application platform, etc.) Those versed in the art will readily appreciate that these teaching, likewise, applicable to any video call provided, at least partly, in a packet switched network.

It is to be understood that the invention is not limited in its application to the details set forth in the description contained herein or illustrated in the drawings. The invention is capable of other embodiments and of being practiced and carried out in various ways. It should be noted that the invention is not bound by the specific algorithm of processing or specific structure. Those versed in the art will readily appreciate that the invention is, likewise, applicable to any other processing or presentation with equivalent and/or modified functionality which may be consolidated or divided in another manner.

It will also be understood that the invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A service system configured for use in conjunction with a hybrid network comprising at least one circuit-switched network and at least one packet-switched network connected via at least one gateway configured to provide necessary conversion to a video call passing between the packet-switched network and the circuit-switching network, the service system further configured to be located in the packet-switched network and to be operatively interfaced to the gateway, the service system comprising a service platform and one or more application platforms configured to accommodate two or more applications and operatively connected to the service platform, wherein the service platform comprises:
   (a) a network interface adapted for receiving the video call transferred through the gateway, and for analyzing, at least, the call's in-band information, therefore recognizing a desired destination and
   (b) a call manager operatively coupled to the network interface and adapted for re-directing the video call in accordance with the desired destination to respective application platform and to enable transferring, at least, entire in-band information to the application platform, thus enabling the application platform to serve as an end-point for the video call, wherein the call manager is further configured to derive meta-data comprised, at least, in the in-band information and transfer this meta-data and/or derivatives thereof to the application platform as a first token assigned to the video-call,
   wherein the service platform is further configured to operatively interface to a third party database in order to obtain out-band information related to the calling user and include at least part of said out-band information and/or derivatives thereof in the first token when generating thereof.

2. The service system of claim 1 wherein the application platform is configured, when providing the services, to provide at least one of the following in accordance with obtained first token:
   (a) personalization of application presentation;
   (b) personalization of application navigation;
   (c) personalization of a downstream content;
   (d) personalization of a downstream content format;
   (e) personalization of a downstream mode of transmission;
   (f) generation of a second token assigned to the video-call.

3. The service system of claim 1 wherein the first token comprises information selected from a group comprising Caller ID, SIM number, dialed number, location of the calling user, characteristics of calling video device, preferences related to the calling user, application specific data, call state, call history and DTMF signals generated by the user.

4. A method of providing a service in a hybrid network comprising at least one circuit-switched network and at least one packet-switched network connected via at least one gateway configured to provide necessary conversion to a video call passing between the packet-switched network and the circuit-switching network, the method comprising:
   (a) directing a video call initiated by a video device to a service platform located in the packet-switched network and configured to be operatively interfaced to the gateway and to one or more application platforms configured used to accommodate one or more applications,
   (b) receiving the video call by the service platform;
   (c) further analyzing, at least, call in-band information and therefore recognizing a desired destination,
   (d) deriving meta-data comprised, at least, in the in-band information;
   (e) generating a first token comprising the derived meta-data and/or derivatives thereof;
   (f) transferring the call and corresponding generated first token to respective application platform configured to serve as an end-point for the video call;
   (g) communicating between the service platform and a third party database;
   (h) obtaining, related to the calling user out-band information other than that which may be extracted from the video call; and
   (i) including at least part of said out-band information and/or derivatives thereof in the first token when generating thereof.

5. The method of claim 4 further comprising:
   (a) receiving the re-directed call by the application platform;

(b) deriving application-specific information from at least the first token assigned to the video-call, and
(c) providing one or more services in accordance therewith.

6. The method of claim 5, wherein when providing the services, at least one of the following is provided in accordance with the derived information:
  (a) personalization of application presentation;
  (b) personalization of application navigation;
  (c) personalization of a downstream content;
  (d) personalization of a downstream content format;
  (e) personalization of a downstream mode of transmission; and
  (f) generating a second token assigned to the video-call.

7. The method of claim 4 wherein the first token comprises information selected from a group comprising Caller ID, SIM number, dialed number, location of the calling user, characteristics of calling video device, preferences related to the calling user, application specific data, call state, call history and DTMF signals generated by the user.

8. An application design framework configured for use in conjunction with a hybrid network comprising at least one circuit-switched network and at least one packet-switched network connected via at least one getaway configured to provide necessary conversion to a video call passing between the packet-switched network and the circuit-switching network, the application design framework further configured to be located in the packet-switched network, to be operatively interfaced to the gateway and to enable development of one or more applications to be accommodated by said framework; the application framework further comprising:
  (a) a communication interface adapted for receiving a video call initiated by a video device from the circuit-switched network and transferred through the gateway, and for further serving as an end-point of said video call;
  (b) a call manager operatively coupled to the communication interface and adapted for analyzing, at least, meta-data and/or derivatives thereof received together with the video call, and further enabling providing said meta-data and/or derivatives thereof, as a first token assigned to the video-call, to one or more applications when accommodated by the framework; and
  (c) a media manager configured to enable handling one or more media streams in accordance with instructions by one or more applications when accommodated by the framework, wherein the media manager further configured to extract data from an up-stream media received via the video call and provides the extracted data to one or more applications when accommodated by the framework,
  wherein said application interface is further configured to enable the accommodated application to generate a second token to be assigned to and transferred with the video call, said second token comprising data received by the application from the call manager and/or the media manager.

9. The application framework of claim 8 comprising at least one application program interface configured to enable developing at least one of applications selected from a group comprising interactive video game, multi-user video-game, camera surveillance applications, multi-user phone blogging application, real-time data feeds for push and pull services, such as system monitoring, financial, weather, news, and traffic updates.

10. The application framework of claim 8 wherein the call manager is further configured to receive and recognize out-band user-related information and to provide said information to one or more applications when accommodated by the framework.

11. The application framework of claim 8 wherein the call manager is further configured to enable initiating a video call to one or more users, if said call has been requested by one or more applications when accommodated by the framework.

12. An application design framework configured for use in conjunction with a hybrid network comprising at least one circuit-switched network and at least one packet-switched network connected via at least one gateway configured to provide necessary conversion to a video call passing between the packet-switched network and the circuit-switching network, the application design framework further configured to be located in the packet-switched network, to be operatively interfaced to the gateway and to enable development of one or more applications to he accommodated by said framework; the application framework further comprising:
  (a) a communication interface adapted for receiving a video call initiated by a video device from the circuit-switched network and transferred through the gateway, and for further serving as an end-point of said video call;
  (b) a call manager operatively coupled to the communication interface and adapted for analyzing, at least, meta-data and/or derivatives thereof received together with the video call, and further enabling providing said meta-data and/or derivatives thereof to one or more applications when accommodated by the framework;
  (c) one or more protocol stacks;
  (d) means for processing upstream and/or downstream media;
  (e) a first API configured to enable the developed application at least to receive incoming calls, generate outbound calls, receive and respond to signaling events, receive and send media; and
  (f) a second API configured to provide at least a simplified set of necessary functions and callbacks for application development in high level languages.

13. An application platform configured for use in conjunction with a hybrid network comprising at least one circuit-switched network and at least one packet-switched network connected via at least one gateway configured to provide necessary conversion to a video call passing between the packet-switched network and the circuit-switching network, the application platform further configured to be located in the packet-switched network, to be operatively interfaced to the gateway and to accommodate one or more applications; the application platform comprising:
  (a) a communication interface adapted for receiving a video call initiated by a video device from the circuit-switched network and transferred through the gateway and for further serving as an end-point of said video call;
  (b) means for analyzing, at least, meta-data and/or derivatives thereof comprised in a first token received with the video call therefore recognizing user-related information;
  (c) means for providing one or more services accordance recognized user-related information,
    wherein said application is further configured to generate a second token to be assigned to and transferred with the video call, said second token comprising data and/or derivatives thereof received from the first token and/or out-band user-related information and/or an up-stream media.

14. The application platform of claim 13 configured, when providing the services, to provide at least one of the following in accordance with the analyzed meta-data and/or derivatives thereof:
 (a) personalization of application presentation;
 (b) personalization of application navigation;
 (c) personalization of a downstream content;
 (d) personalization of a downstream content format;
 (e) personalization of a downstream mode of transmission;
 (f) generation of a second token assigned to the video call.

15. The application platform of claim 13 further configured to receive and recognize out-band user-related information and to provide one or more services in accordance with a combination of at least part of metadata and/or derivatives thereof extracted from the first token and the out-band information.

16. The application platform of claim 15 wherein said combined information is selected from a group comprising Caller ID, SIM number, dialed number, location of the calling user, characteristics of calling video device, preferences related to the calling user, application specific data, call state, call history and DTMF signals generated by the user.

17. The application platform of claim 13 further configured to extract data from an up-stream media received via the video call and provide one or more services accordingly.

18. The application platform of claim 13 wherein said extracted data are used for at least one of the following:
 (a) a surveillance application initiating a call to a second user if said data received from a first user fit certain criteria;
 (b) identifying the calling user;
 (c) authorizing the calling user;
 (d) generating and augmented reality image to be sent to the calling user;
 (e) enhancing the received image for further sending to the calling user.

19. The application platform of claim 13 further configured to initiate a video call to one or more users, said call being pre-scheduled or initiated in accordance with user-related and/or application-related event and transferred together with the assigned second token.

* * * * *